US012185282B2

(12) United States Patent
Ryu et al.

(10) Patent No.: US 12,185,282 B2
(45) Date of Patent: Dec. 31, 2024

(54) CHANNEL SENSING INDICATION FROM MAC LAYER TO PHY LAYER

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Qing Li, Princeton Junction, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 17/658,430

(22) Filed: Apr. 7, 2022

(65) Prior Publication Data

US 2023/0328693 A1     Oct. 12, 2023

(51) Int. Cl.
*H04W 72/02*     (2009.01)
*H04W 16/28*     (2009.01)
(Continued)

(52) U.S. Cl.
CPC ........... *H04W 72/02* (2013.01); *H04W 16/28* (2013.01); *H04W 28/26* (2013.01); *H04W 72/046* (2013.01); *H04W 72/20* (2023.01)

(58) Field of Classification Search
CPC ..... H04W 72/02; H04W 16/28; H04W 28/26; H04W 72/046; H04W 72/20;
(Continued)

(56) References Cited

U.S. PATENT DOCUMENTS

2021/0352625 A1  11/2021  Akkarakaran et al.
2022/0182979 A1* 6/2022  Freda ................ H04W 72/1263
(Continued)

FOREIGN PATENT DOCUMENTS

WO     2020033622 A1    2/2020
WO     2020068906 A1    4/2020
(Continued)

OTHER PUBLICATIONS

3GPP, R1-210xxxx, "resource allocation for power saving" (Year: 2021).*
(Continued)

*Primary Examiner* — Jung H Park
(74) *Attorney, Agent, or Firm* — Procopio, Cory, Hargreaves & Savitch LLP

(57) ABSTRACT

A first UE may receive SCI including one or more resource reservations of a second UE based on an indication from a MAC layer to a PHY layer to monitor for the SCI including the one or more resource reservations of the second UE. The indication from the MAC layer to the PHY layer may trigger at least one of a sensing beam, a TCI state, or a spatial relation. The at least one of the sensing beam, the TCI state, or the spatial relation may be associated with monitoring for the SCI including the one or more resource reservations of the second UE. The first UE may transmit a beam to a target UE on one or more resources that are selected based on the one or more resource reservations of the second UE.

30 Claims, 13 Drawing Sheets

(51) Int. Cl.
*H04W 28/26* (2009.01)
*H04W 72/044* (2023.01)
*H04W 72/20* (2023.01)

(58) Field of Classification Search
CPC . H04W 72/25; H04W 72/40; H04W 74/0808; H04L 5/0023; H04L 5/0053; H04B 7/06954; H04B 7/088; H04B 7/0695
See application file for complete search history.

(56) References Cited

U.S. PATENT DOCUMENTS

| | | | | |
|---|---|---|---|---|
| 2023/0156858 | A1* | 5/2023 | Freda | H04W 52/0229 |
| | | | | 370/329 |
| 2023/0292348 | A1* | 9/2023 | Kim | H04W 72/044 |
| 2024/0179725 | A1* | 5/2024 | Hui | H04W 76/20 |
| 2024/0188107 | A1* | 6/2024 | Elkotby | H04W 28/26 |
| 2024/0196419 | A1* | 6/2024 | Ye | H04W 72/541 |

FOREIGN PATENT DOCUMENTS

| WO | 2022047460 A1 | 3/2022 |
|---|---|---|
| WO | 2022047733 A1 | 3/2022 |

OTHER PUBLICATIONS

Intel Corporation: "Sidelink Resource Allocation Mode-2 Design for NR V2X Communication," 3GPP TSG RAN WG1 Meeting #97, R1-1906796, Intel—EV2X Sl M2, 3rd Generation Partnership Project, Mobile Competence Centre, 650, Route Des Lucioles, F-06921, Sophia-Antipolis Cedex, France, vol. RAN WG1, No. Reno, USA, May 13, 2019-May 17, 2019, May 13, 2019, 18 pages, XP051728247, paragraph [2.11].

International Search Report and Written Opinion—PCT/US2023/012740—ISA/EPO—Jul. 5, 2023.

* cited by examiner

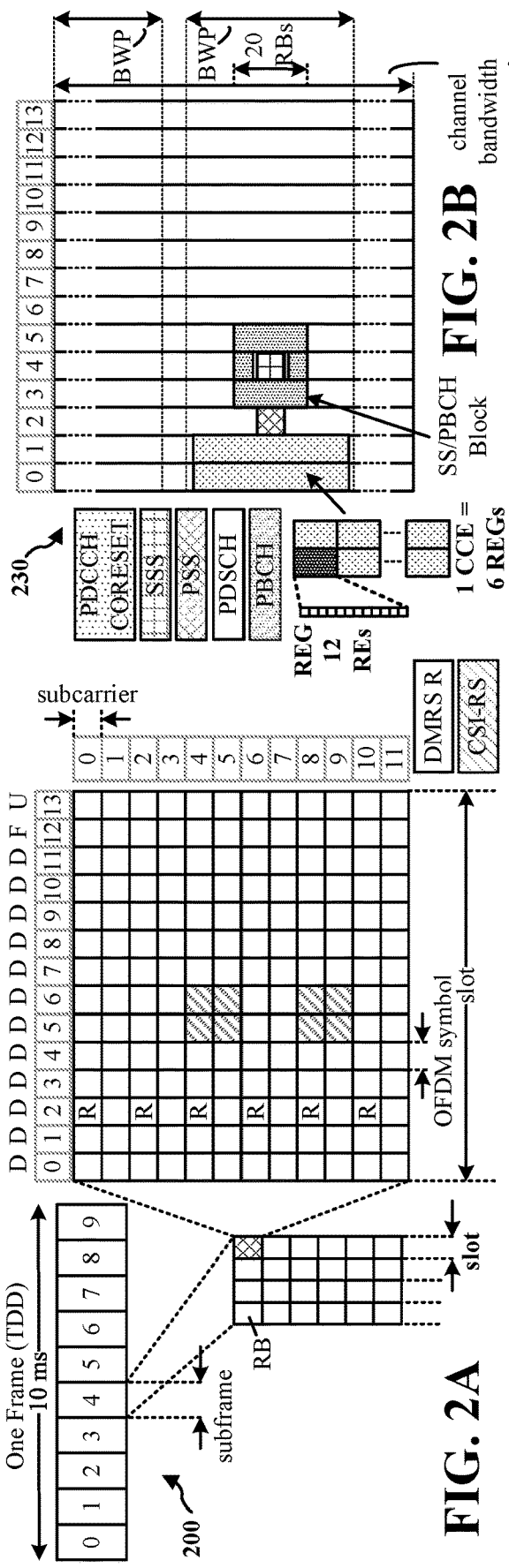
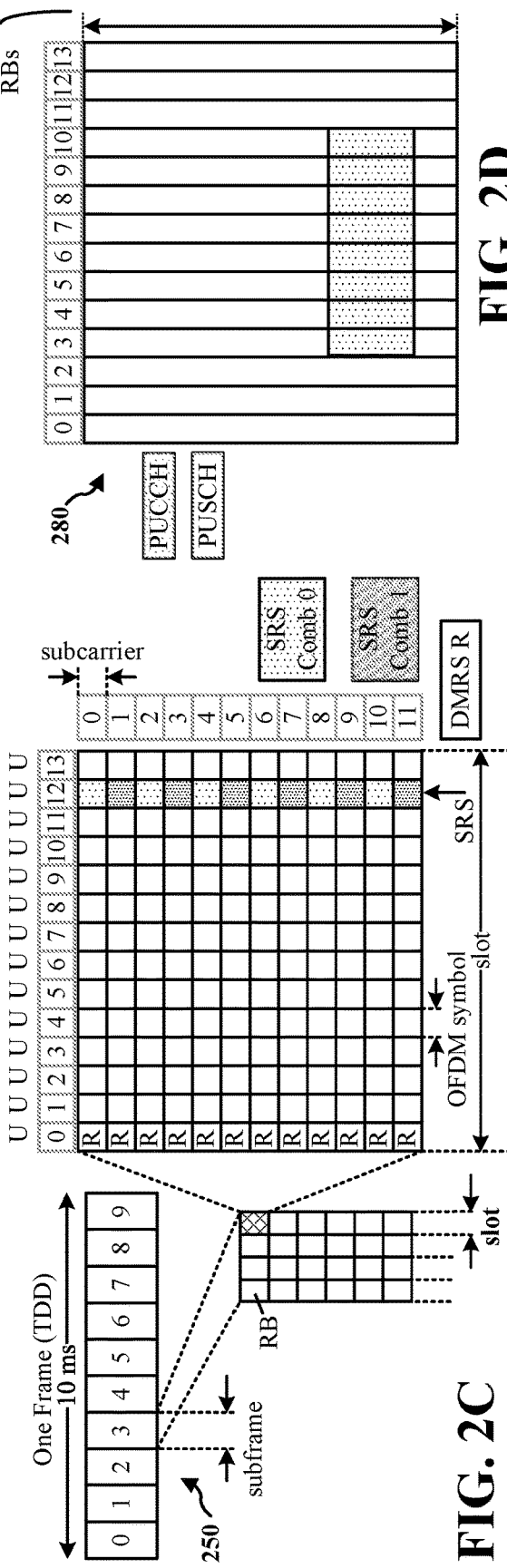
FIG. 2A
FIG. 2B
FIG. 2C
FIG. 2D

CHANNEL SENSING INDICATION FROM MAC LAYER TO PHY LAYER

TECHNICAL FIELD

The present disclosure relates generally to communication systems, and more particularly, to channel sensing indications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be at a first user equipment (UE) and may receive sidelink control information (SCI) including one or more resource reservations of a second UE based on an indication from a medium access control (MAC) layer to a physical (PHY) layer to monitor for the SCI including the one or more resource reservations of the second UE, the indication from the MAC layer to the PHY layer triggering at least one of a sensing beam, a transmission configuration indicator (TCI) state, or a spatial relation, where the at least one of the sensing beam, the TCI state, or the spatial relation is associated with monitoring for the SCI including the one or more resource reservations of the second UE; and transmit a beam to a target UE on one or more resources that are selected based on the one or more resource reservations of the second UE.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
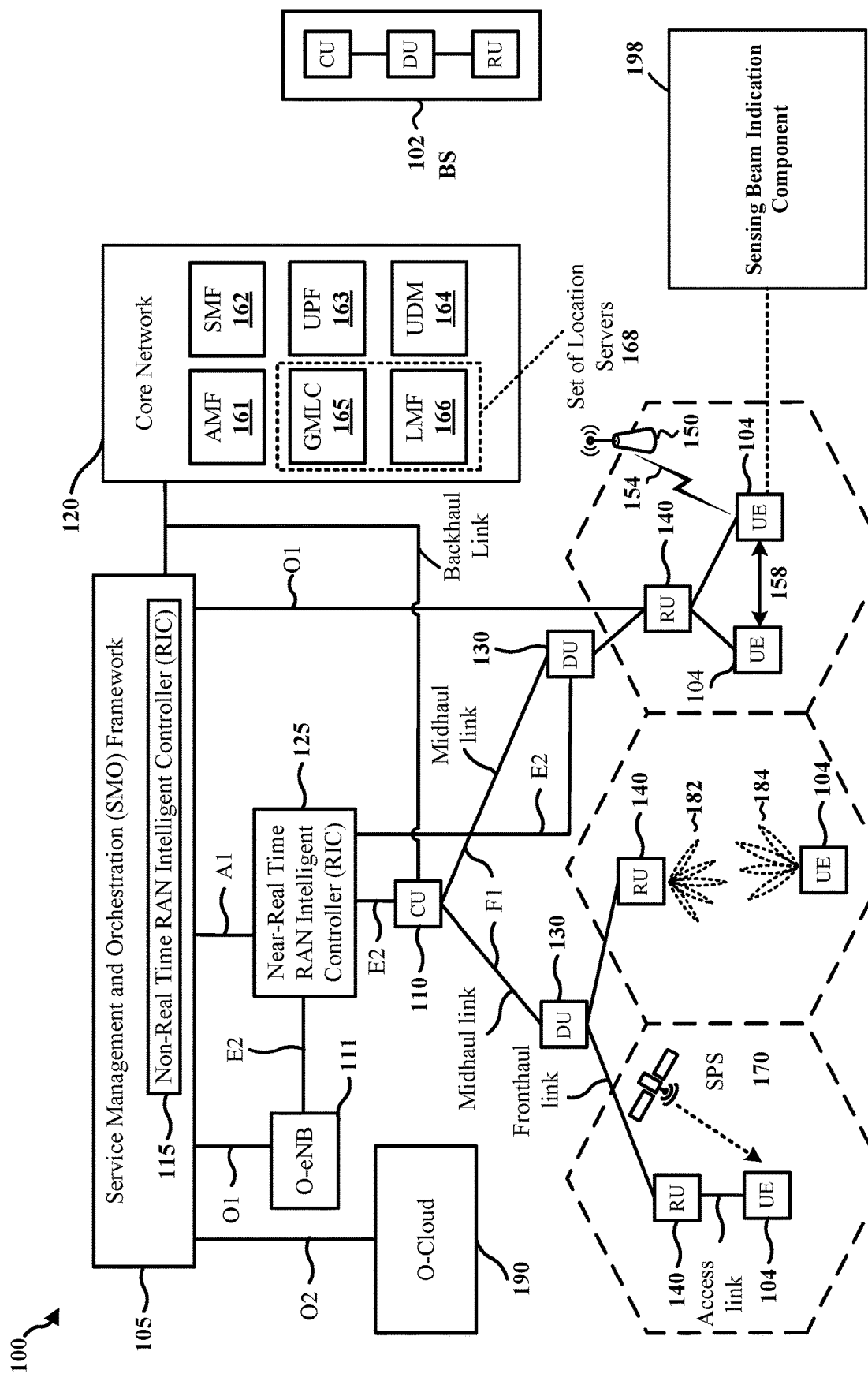
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network.

The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective user equipments (UEs) 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a sensing beam indication component 198 configured to receive sidelink control information (SCI) including one or more resource reservations of a second UE based on an indication from a medium access control (MAC) layer to a physical (PHY) layer to monitor for the SCI including the one or more resource reservations of the second UE, the indication from the MAC layer to the PHY layer triggering at least one of a sensing beam, a transmission configuration indicator (TCI) state, or a spatial relation, where the at least one of the sensing beam, the TCI state, or the spatial relation is associated with monitoring for the SCI including the one or more resource reservations of the second UE; and transmit a beam to a target UE on one or more resources that are selected based on the one or more resource reservations of the second UE. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
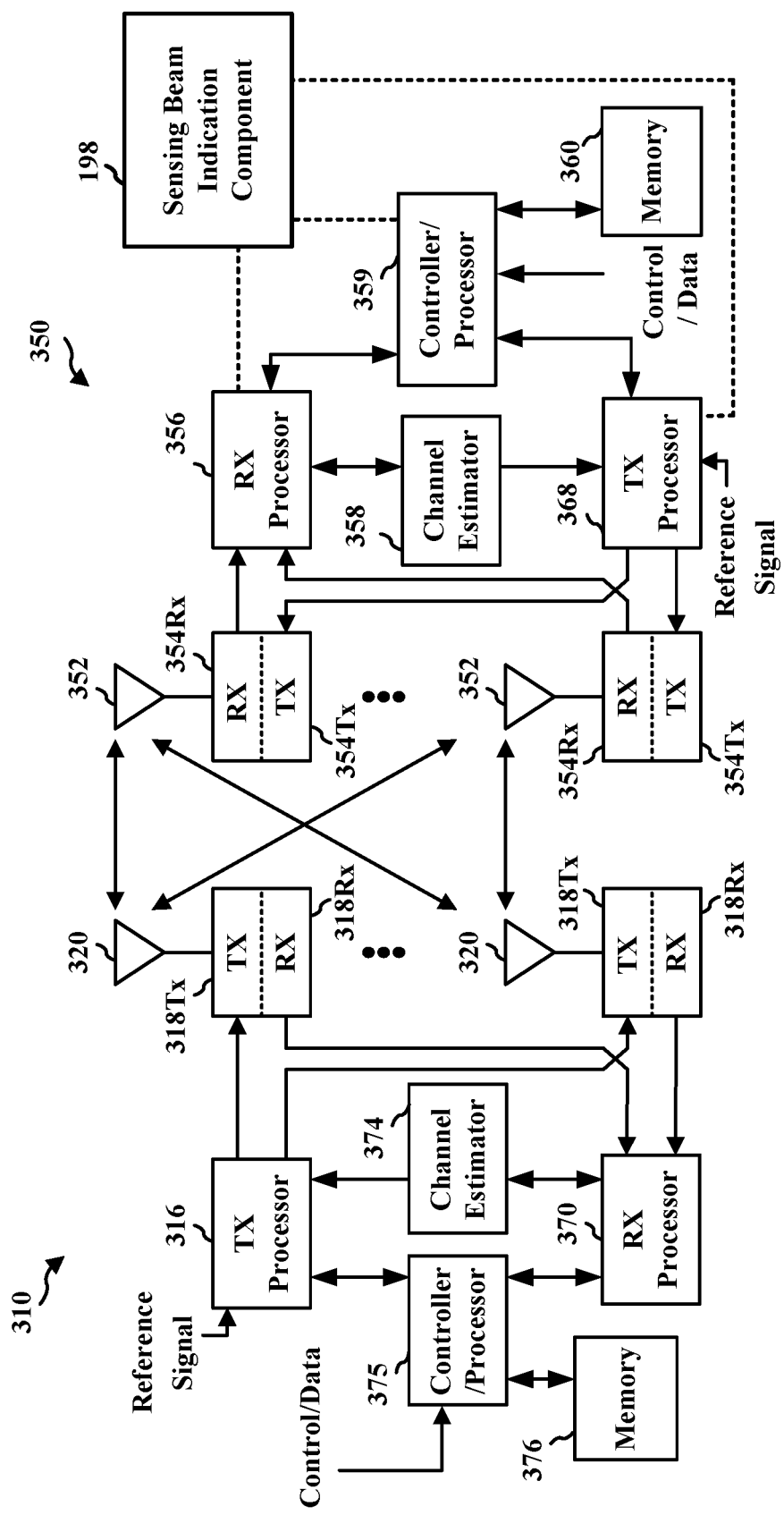
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the sensing beam indication component 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc., that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
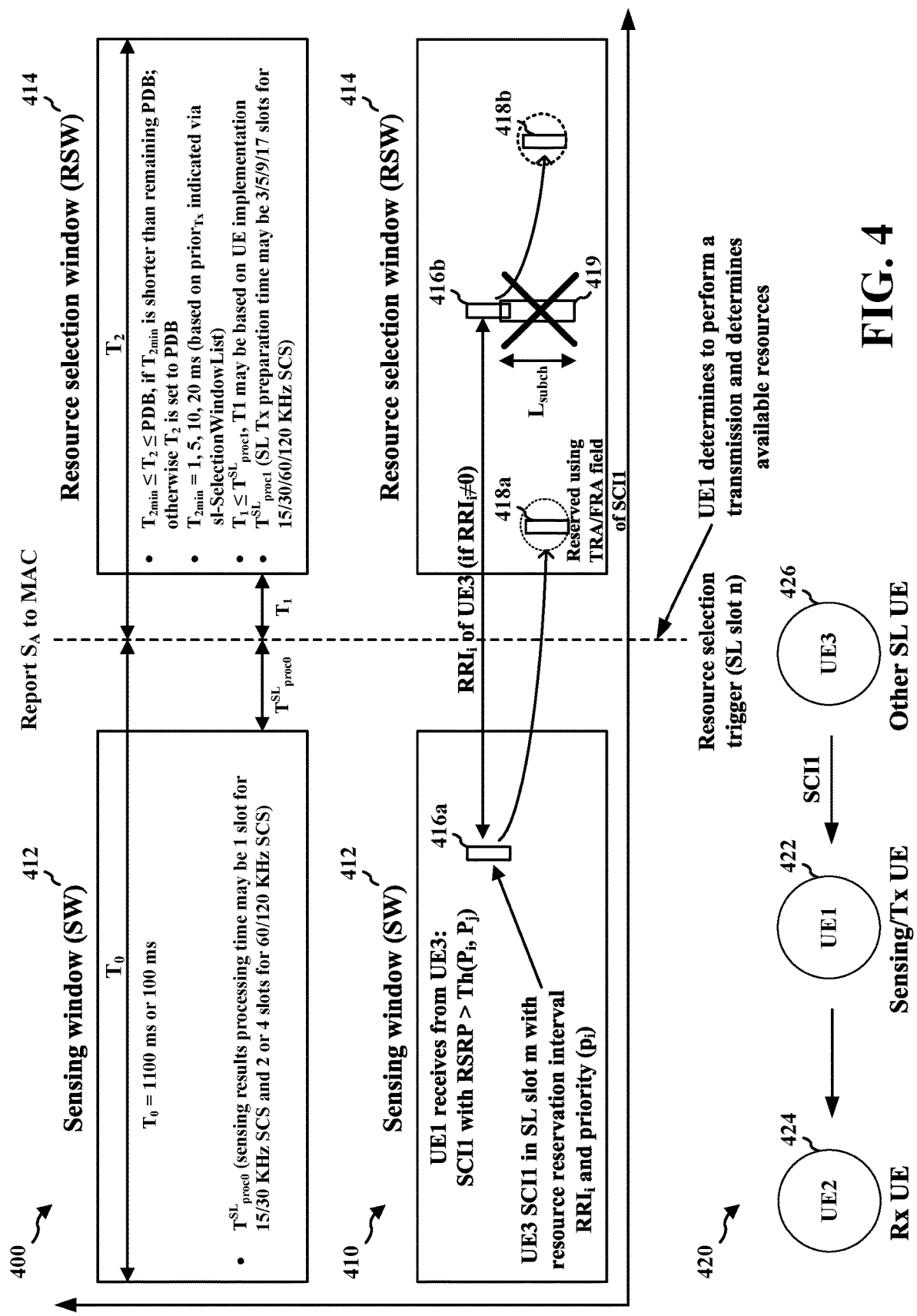
FIG. 4 illustrates diagrams indicative of resource sensing and selection techniques.

FIG. 4 illustrates diagram 400, diagram 410, and diagram 420 indicative of resource sensing and selection techniques. Mode 2 sidelink resource determination procedures may not include signaling from a base station to indicate to a sensing/Tx UE, such as UE1 422, which resources the sensing/Tx UE may use for a transmission to an Rx UE. Instead, UE1 422 may determine time-frequency resources for the transmission to the Rx UE, such as UE2 424, based on received SCI from other sidelink UEs, such as UE3 426. UE1 422 may determine that UE3 426 is in proximity to UE1 422 based on channel sensing. UE1 422 may further determine the time-frequency resources that UE1 422 may use for the transmission to UE2 424 based on an SCI1 received from UE3 426 indicative of the time-frequency resources that are already reserved by UE3 426. UE1 422 may listen for control signals from other sidelink UEs, such as UE3 426, as control signaling, such as the SCI1, may include resource reservation information for UE3 426. The sensing/Tx UE may perform full sensing in some cases, where the sensing/Tx UE is assumed to be continuously sensing the channel.

The sensed/received SCI1 from UE3 may indicate to UE1 422 one or more scheduled transmissions of UE3 426 associated with particular times and frequencies of a bandwidth. For example, the SCI1 may include resource reservation information indicative of resources that may be used for future transmissions of UE3 426. Based on the resource reservations, UE1 422 may determine which resources are available for UE1 422 to use for the transmission to UE2 424. That is, the reservation information included in the SCI1 may allow UE1 422 to determine the resources that UE3 426 may be using for other transmissions.

SCI may include a time resource assignment (TRA)/frequency resource assignment (FRA) field as well as a resource reservation interval (RRI) field that may be indicative of resource reservations. The TRA/FRA field may be used for reserving resources for retransmission. For example, retransmission resource 418a and retransmission resource 418b may be reserved using the TRA/FRA field of SCI1. The SCI1 of UE3 426 may be received by UE1 422 in a sidelink slot m with an RRI of RRIi and priority $p_i$. The RRI field may be indicative of periodic transmissions. The time interval between two periodic transmissions may be equal to the RRI. The diagram 410 illustrates an example $RRI_i$ of UE3 426, where the $RRI_i \neq 0$. UE1 422 may determine resources that other sidelink UEs, such as UE3 426, may be using for transmissions based on a first transmission resource 416a and a second transmission resource 416b that occupy a same frequency resource (e.g., periodic transmissions). UE1 422 may utilize remaining available resources for a transmission to UE2 424.

An available resource determination by UE1 422 may be based on an RSRP of a received SCI, a transmission priority of UE1 422, and/or a priority indicated via the received SCI. In the diagram 410, UE1 422 may receive from UE3 426 the SCI1 with an RSRP>Th($P_i$, $P_j$). If the RSRP of the received SCI is higher than the RSRP threshold, the resources reserved by the received SCI may be determined as unavailable resources for UE1 422. If the RSRP of the received SCI is lower than the RSRP threshold, a same resource indicated by the SCI may be determined as available for UE1 422. UE1 422 may generate a set of available resources ($S_A$) at the PHY layer that may be used by UE1 422 to select transmission resources at the MAC layer.

Resource selection parameters at the MAC layer may be indicated to the PHY layer. The MAC layer may determine data to be transmitted by UE1 422 and may indicate to the PHY layer one or more resources that the MAC layer selects for transmission during a resource selection window (RSW) 414, associated with a time $T_2$. At a sidelink slot n, the MAC layer may trigger the PHY layer to determine a set of available resources from which the MAC layer will select the resources for transmission. The PHY layer may sense a channel during a sensing window (SW) 412 associated with a time $T_0$ and may report a set of available resources ($S_A$) to the MAC layer. In examples, $T_0$ may correspond to 1100 ms or 100 ms, which may be equal to a duration of the SW 412 minus a sensing results processing time $T^{SL}_{proc0}$. The sensing results processing time may be 1 slot for 15/30 KHz SCS and 2 or 4 slots for 60/120 KHz SCS. UE1 422 may determine to perform a transmission and may determine available resources at an end of the sensing results processing time $T^{SL}_{proc0}$ that follows the SW 412, where the sensing results processing time $T^{SL}_{proc0}$ may precede the RSW 414 by a time $T_1$.

Time $T_2$ associated with the RSW 414 may similarly correspond to a time $T_1$ that precedes the RSW 414 plus a duration of the RSW 414. Time T2 may be characterized via $T_{2min} \leq T_2 \leq PDB$, if $T_{2min}$ is shorter than a remaining packet delay budget (PDB). Otherwise time $T_2$ may correspond to the PDB. $T_{2min}$ may be equal to 1 ms, 5 ms, 10 ms, 20 ms, etc., based on an L1 priority of the transmission (prior$_{Tx}$) indicated via sl-SelectionWindowList. For instance, priority values of 0, 1, 2, 3, 4, 5, 6, 7 may map to 20 ms, 20 ms, 20 ms, 20 ms, 10 ms, 10 ms, 10 ms, 10 ms, respectively. In examples, $T_1 \leq T^{SL}_{proc1}$, where $T_1$ may be based on UE implementation. The sensing results processing time $T^{SL}_{proc1}$ may correspond to a sidelink Tx preparation time and may be 3/5/9/17 slots for 15/30/60/120 KHz SCS.

In order for the PHY layer to begin sensing the channel to determine resources that may be available for transmissions of UE1 422, the MAC layer may indicate one or more sensing parameters to the PHY layer to perform the sensing of the channel during the SW 412. Parameters indicated from the MAC layer to the PHY layer may include an indication of a resource pool for resource selection by the MAC layer. That is, the MAC layer may indicate which resource pool the PHY layer may use to perform the sensing of the channel during the SW 412. The MAC layer may also indicate parameters such as an L1 priority of the transmission (prior$_{Tx}$), a remaining PDB associated with a time at which the transmission is to be performed, a bandwidth/number of subchannels ($L_{subch}$), a resource reservation interval ($P_{rsvp\_Tx}$) in cases of multiple MAC PDUs (e.g., for periodic transmissions), etc. Accordingly, the MAC layer may indicate parameters to the PHY layer, which the PHY layer may use for sensing procedures.

For reevaluation and preemption techniques, the MAC layer may provide to the PHY layer a first set of resource ($r_0$, $r_1$, $r_2$, ...) for reevaluation and a second set of resources ($r'_0$, $r'_1$, $r'_2$, ...) for preemption. Preemption procedures may be enabled based on parameters such as sl-PreemptionEnable. UE1 422 may sense/monitor for SCI from UE3 426 in the SW 412. UE1 422 may perform continuous sensing when operating in a full sensing mode. However, continuous/full sensing may cause UE1 422 to consume an increased amount of power. Thus, partial sensing may be performed by UE1 422 to reduce the amount of power consumed by UE1 422 based on reducing the sensing load at the PHY layer. The PHY layer may report the set of available resources $S_A$ to the MAC layer at slot n for selection of resources by the MAC layer during the RSW 414. The set of available resources $S_A$ may be initialized for the sidelink resources in the RSW 414. UE1 422 may exclude resources from the set of available resources $S_A$ before reporting the set of available resources $S_A$ to the MAC layer.

The MAC layer may trigger resource selection at sidelink slot n. Prior to UE1 422 determining to transmit and determining available resources for transmission, the PHY layer may sense the channel/receive SCI from other sidelink UEs, such as UE3 426. In an example, UE1 422 may receive SCI from UE3 426 with an RSRP that is greater than the RSRP threshold. The SCI may include the resource reservation information of UE3 426, which may be associated with the RRI. The SCI transmitted from UE3 426 to UE1 422 may indicate time-frequency resources that UE3 426 may use to perform a transmission (e.g., at a time period of the RRI into the future). Contiguous $L_{subch}$ resources 419 that overlap with reserved resources of UE3 426, such as an overlap with the second transmission resource 416b, may be excluded as available resources for transmissions of UE1 422.

The resources for a next transmission may also be associated with a reservation for a retransmission of a packet, which may be based on the TRA/FRA field. For example, the TRA/FRA field may be indicative of a retransmission of the packet at a particular time. If the UE1 receives an SCI with an RSRP that is greater than the RSRP threshold, UE1 may determine that associated resources are not available or may be used by UE2. Since the RSRP is greater than the RSRP threshold, the resources may also be unavailable for the MAC layer of UE1 to use for transmission.

Figure 5:
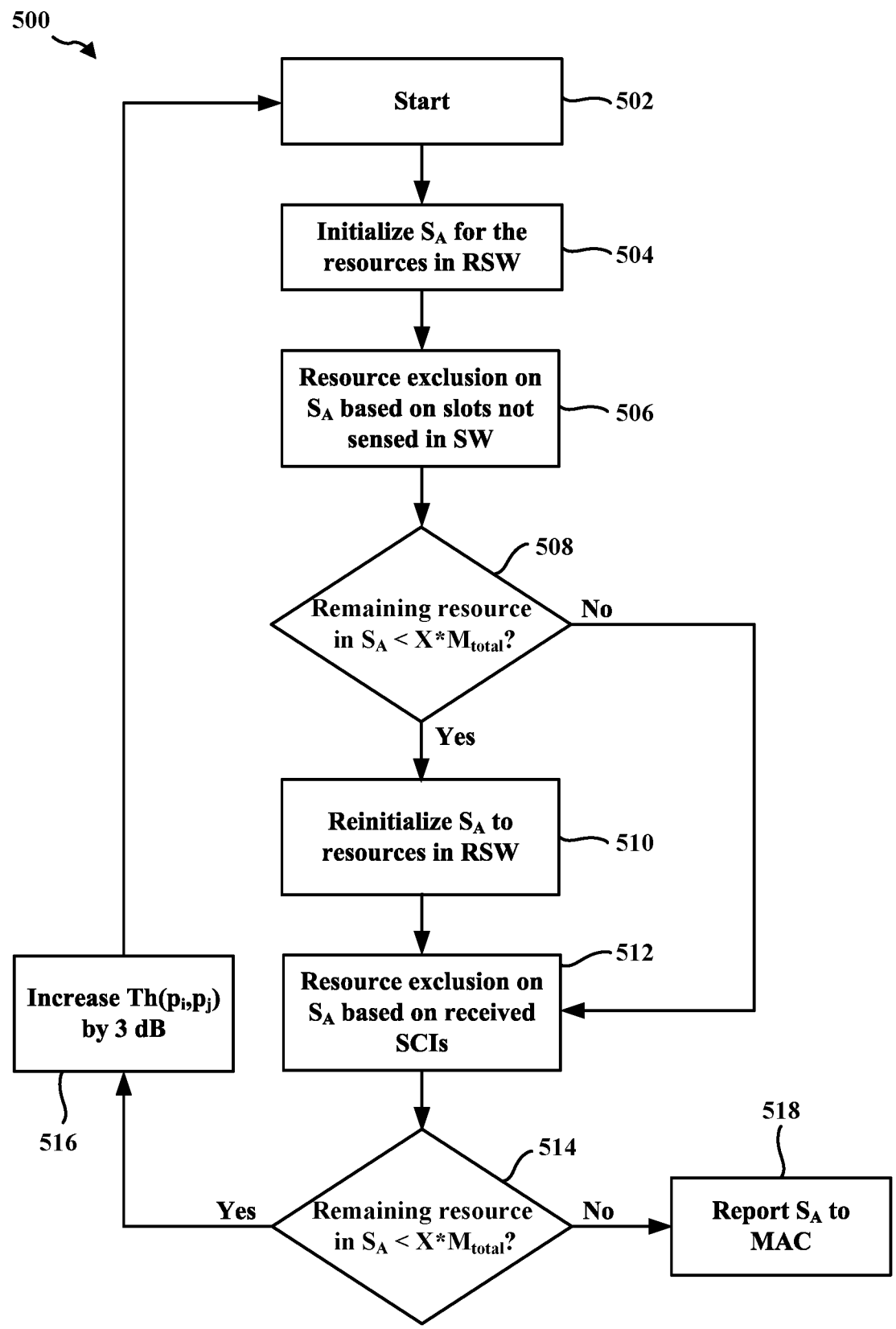
FIG. 5 is a flow diagram illustrating an available resource determination procedure performed at a physical (PHY) layer for full sensing.

FIG. 5 is a flow diagram 500 illustrating an available resource determination procedure performed at the PHY layer for full sensing. The PHY layer may perform a plurality of procedures for sensing the channel. After the MAC layer indicates the sensing parameters, the PHY layer may start a channel sensing procedure, at 502. The PHY layer may initialize, at 504, the set of available resources $S_A$ for the resources in the RSW. For example, the PHY layer may assume that all of the resources in the RSW are available resources upon initialization, at 504. The RSW may correspond to a window of resources from which the MAC layer may select transmission resources of the UE.

Resource exclusion may be performed, at 506, on the set of available resources $S_A$ based on slots that are not sensed in the SW. The Tx UE may assume that another sidelink UE is transmitting an SCI on resources where the Tx UE is not sensing the channel. Future resources associated with resources where the Tx UE is not sensing the channel may be determined as unavailable resources for the Tx UE. The set of available resources $S_A$ that the PHY layer reports to the MAC layer after the resource exclusion, at 506, may include a certain amount of remaining resources.

At 508, the PHY layer may determine whether the remaining resources in the set of available resources $S_A < X^* M_{total}$. $M_{total}$ may correspond to the total number of $L_{subch}$ contiguous subchannels in the RSW. X may be based on $p_i = prio_{Tx}$, and may be indicated via sl-TxPercentageList. Example values for X may include 0.2, 0.35, and 0.5. If after the resource exclusion, at 506, the amount of resources remaining in the set of available resources $S_A$ is less than $X^* M_{total}$, the set of available resources $S_A$ may be reinitialized, at 510, to the resources in the RSW. That is, the set of available resources may have to be adjusted so that the MAC layer has enough available resources for performing resource selection.

After re-initialization, at 510, resource exclusion may be performed, at 512, on the set of available resources $S_A$ based on received SCIs from other sidelink UEs. In examples where the remaining resources in the set of available resources $S_A$ are determined, at 508, to be greater than or equal to $X^* M_{total}$, the resource exclusion may be performed, at 512, without re-initialization, at 510, of the set of available resources $S_A$. The resources that are used by the other sidelink UEs may also be excluded from the set of available resources $S_A$ based on the RSRP threshold.

If the remaining resources in the set of available resources $S_A$ are determined, at 514, to be greater than or equal to $X^* M_{total}$, the PHY layer may generate the set of available resources $S_A$ and report, at 518, the set of available resources $S_A$ to the MAC layer. If after the resource exclusion, at 512, the number of resources remaining in the set of available resources $S_A$ is less than $X \cdot M_{total}$, $Th(p_i, p_j)$ may be increased, at 516, by 3 dB for each priority value $Th(p_i, p_j)$ and the available resource determination procedure may be restarted, at 502.

Figure 6:
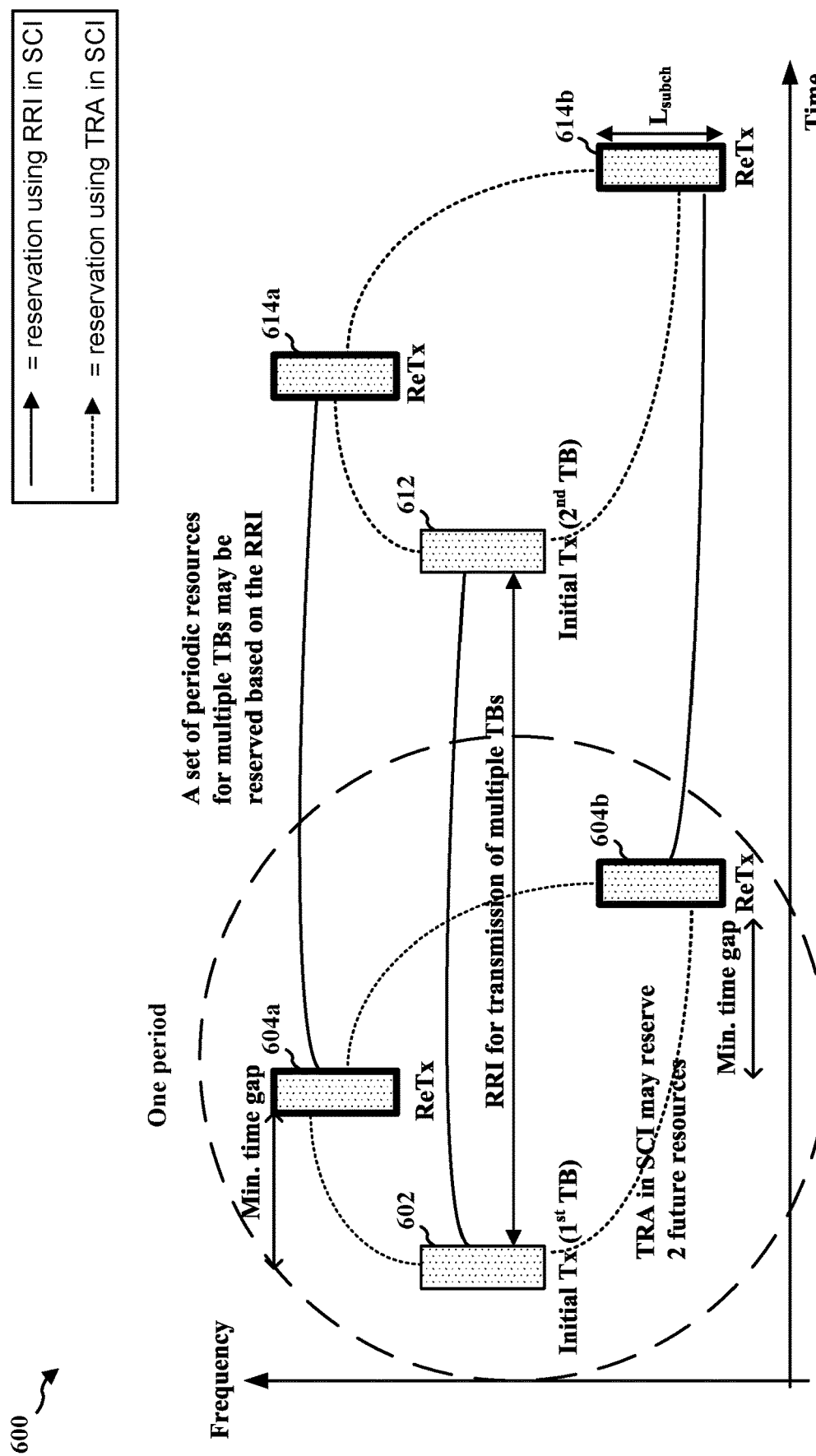
FIG. 6 is a diagram that illustrates a resource allocation for one or more initial transmissions and one or more retransmissions.

FIG. 6 is a diagram 600 that illustrates a resource allocation for one or more initial transmissions 602/612, one or more retransmissions 604a-604b, and one or more retransmissions 614a-614b. After the MAC layer of a UE selects resources for transmission, the resources may be reserved based on the TRA/FRA field of the SCI and/or based on the RRI associated with the SCI. In examples, the TRA/FRA field in the SCI may reserve two future resources (e.g., resources for two retransmissions).

If the MAC layer indicates a single transmission (e.g., based on transmission of one TB), the single transmission may occur over one period. One period may include an initial transmission 602 and one or more retransmissions 604a-604b of the initial transmission 602. The one or more retransmissions 604a-604b may follow each other based on a minimum time gap and/or the initial transmission 602 based on the minimum time gap. Resource reservation information may be included in the SCI associated with the initial transmission 602.

A set of periodic resources for transmission of multiple TBs may be reserved based on the RRI. If the MAC layer indicates multiple TBs or periodic transmissions, the RRI field of SCI may be used to indicate one or more additional periods of transmission. For example, a second TB may be used to indicate the initial transmission 612, which may reserve the one or more retransmissions 614a-614b.

The TRA/FRA field may indicate future retransmissions up to 31 slots apart. Hence, if the SCI included in the one or more initial transmissions 602/612 indicates one or more retransmissions 604a-604b and one or more retransmissions 614a-614b, the future retransmission may be separated by 31 slots or less. The SCI may indicate one or more retransmissions in some examples. If the UE determines to perform a third retransmission (not illustrated in the diagram 600), the TRA/FRA field of the SCI included in the first retransmission (e.g., retransmission 604a or retransmission 614a) may be used to indicate the second retransmission (e.g., retransmission 604b or retransmission 614b), and the TRA/FRA field of the SCI included in the second retransmission (e.g., retransmission 604b or retransmission 614b) may be used to indicate the third retransmission.

Partial sensing may be performed to reduce power consumption by the Tx UE. Rather than sensing the channel continuously based on full sensing techniques and consuming an increased amount of power, the Tx UE may reduce power consumption based on sensing the channel over a subset of associated time-frequency resources. In order to reduce sensing procedures, the Tx UE may determine candidate slots (e.g., Y candidate slots) in which the Tx UE may perform transmissions. Certain protocols that the Tx UE may follow may include reserving resources for retransmission that are 31 slots or less into the future, reserving periodic resources based on predefined periodicities, etc. Partial sensing may be based on applying resource reservation protocols in the Y candidate slots to reduce the sensing load of the Tx UE.

Two types of partial sensing may include periodic-based partial sensing (PBPS) and contiguous partial sensing (CPS). PBPS may be used to determine resources that are reserved by the other sidelink UEs in proximity to the Tx UE for the other sidelink UEs to perform periodic transmissions. The determination of the resources may be based on RRIs of sensed/received SCIs. CPS may be used to determine resources that are reserved by the other sidelink UEs in proximity to the Tx UE for the other sidelink UEs to perform retransmissions. The determination of the resources may be based on the TRA/FRA field in the sensed/received SCIs.

Figure 7:
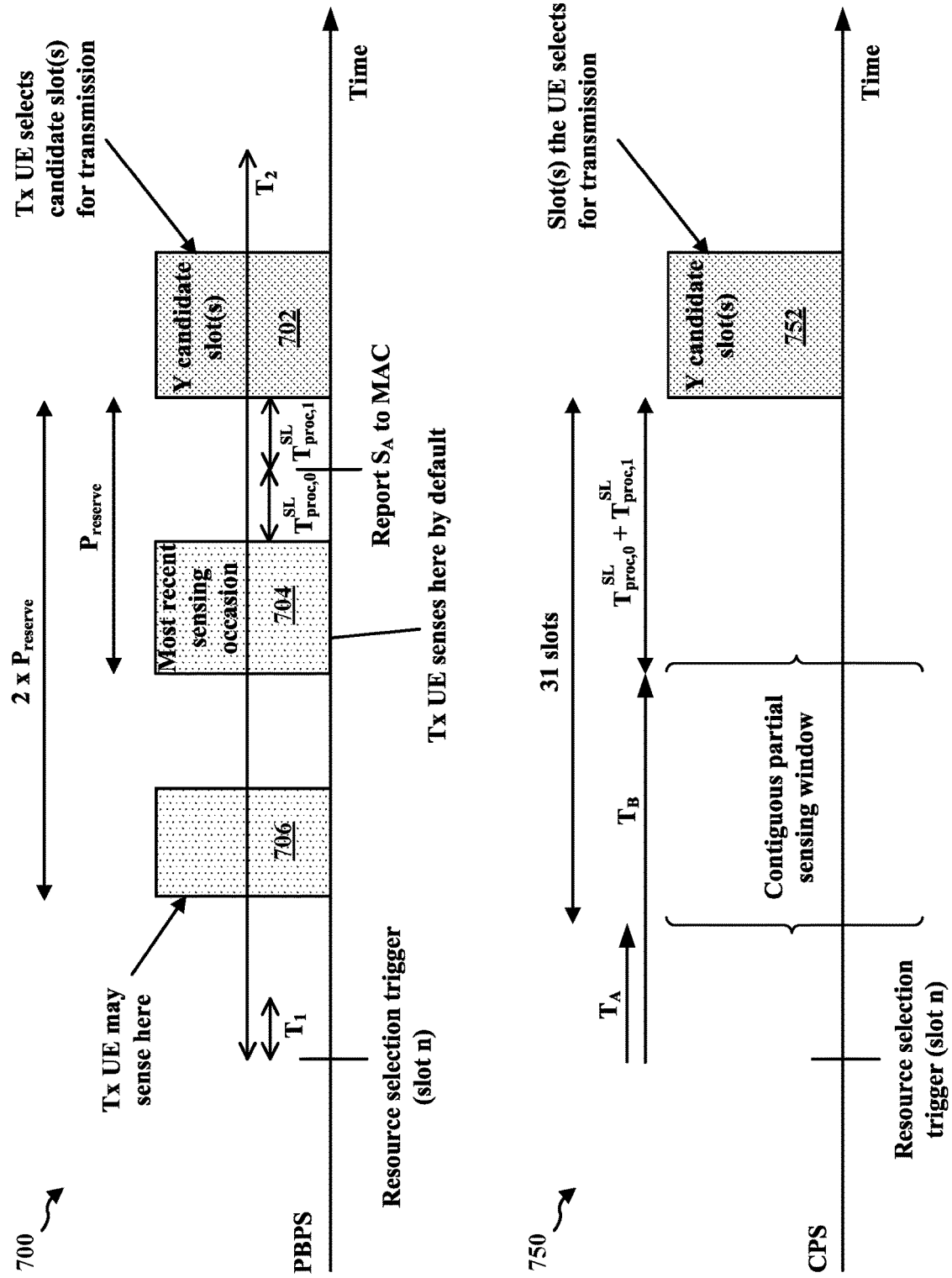
FIG. 7 includes diagrams that illustrate periodic-based partial sensing (PBPS) and contiguous partial sensing (CPS).

FIG. 7 includes diagrams 700-750 that illustrate PBPS and CPS. In the diagram 700, the Tx UE may use one of a fixed number of RRIs associated with a resource pool. For example, sl-ResourceReservePeriodList may correspond to a list of available RRIs that may be used within the resource pool. Based on the list of available RRIs, the Tx UE may perform periodic transmissions according to an interval determined in association with a value included in the list of available RRIs.

The Tx UE may select candidate slots for transmission from a set of Y candidate slots 702. In order to determine resources in the Y candidate slots 702 reserved by the other sidelink UEs, the Tx UE may sense the channel at a most recent sensing occasion 704 $P_{reserve}$ time prior to a start of the Y candidate slots 702. In some examples, the Tx UE may sense the channel at a prior sensing occasion 706 that is $2 \times P_{reserve}$ prior to the start of the Y candidate slots 702. $P_{reserve}$ may correspond to a value associated with a configured set of available RRIs from sl-ResourceReservePeriodList. The Tx UE may sense/monitor for each value from sl-ResourceReservePeriodList.

The Tx UE may perform a transmission within the Y candidate slots 702, where each periodic transmission may be separated by $P_{reserve}$. A gap between the most recent sensing occasion 704 and the Y candidate slots 702 may correspond to time $T^{SL}_{proc0}$+time $T^{SL}_{proc1}$, where the PHY layer may report the set of available resources to the MAC layer between time $T^{SL}_{proc0}$ and time $T^{SL}_{proc1}$. While the most recent sensing occasion 704 may correspond to a default occasion for Tx UE sensing, a prior sensing occasion 706 after the resource selection trigger for slot n may be used for Tx UE sensing in some cases. A time $T_1$ may correspond to a time duration between a resource selection trigger for slot n and a start of the RSW. A time $T_2$ may correspond to the time $T_1$ plus a duration of the RSW.

In the diagram 750, CPS may be used to sense/monitor for reservations for retransmissions, which may be similarly associated with the Y candidate slots 752 where the Tx UE may perform a transmission. When the other sidelink UEs are reserving resources for retransmissions, the other sidelink UEs may have the capability to reserve resources for retransmission up to 31 slots into the future. If the Tx UE attempts to determine whether any of the resources are reserved in the Y candidate slots 752, the Tx UE may limit sensing procedures to 31 slots or less away from the Y candidate slots 752. The Tx UE may sense/monitor for the SCI that may include retransmission reservations up to 31 slots into the future. In examples, the SCI may indicate two resources reservations for retransmissions. The resource reservations for the retransmissions may be 31 slots or less from a slot associated with the SCI.

A processing time may precede the Y candidate slots 752. Thus, the resource reservations may be 31 slots or less from a starting point of the processing time that is offset from the Y candidate slots 752. The starting point of the processing time may correspond to a time $T_A$ that is measured from the resource selection trigger for slot n. A contiguous partial sensing window may begin at an end of the time $T_A$. A time $T_B$ may correspond to a time duration between the resource selection trigger for slot n and an end of the contiguous partial sensing window.

The processing time may be used by the Tx UE to compute a result from the set of available resources $S_A$. For example, $n+T_A$ may correspond to 31 slots before the slot(s) that may be used by the Tx UE for transmission. Similarly, $n+T_B$ may correspond to a time that precedes the slot(s) that may be used by the Tx UE for transmission. A processing time period that follows the contiguous partial sensing window but precedes the Y candidate slots 752 may correspond to a sensing results processing time ($T_{proc,0}^{SL}$) plus a sidelink transmission preparation time ($T_{proc,1}^{SL}$).

Figure 8:
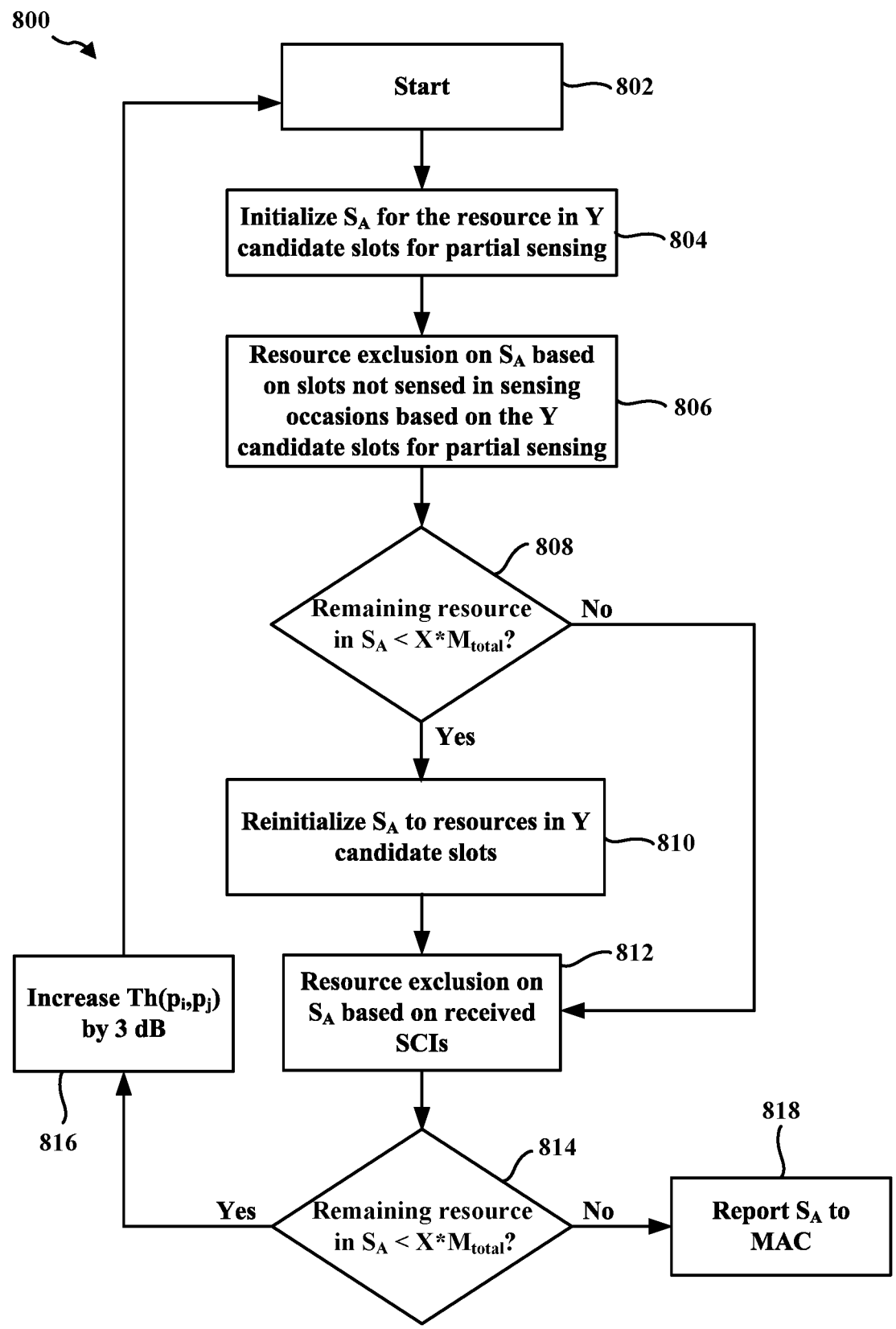
FIG. 8 is a flow diagram illustrating an available resource determination procedure performed at the PHY layer for partial sensing.

FIG. 8 is a flow diagram 800 illustrating an available resource determination procedure performed at the PHY layer for partial sensing. The PHY layer may perform a plurality of procedures for sensing the channel. After the MAC layer indicates the sensing parameters, the PHY layer may start a channel sensing procedure, at 802. The PHY layer may initialize, at 804, the set of available resources $S_A$ for the resources in the Y candidate slots for partial sensing. For example, the PHY layer may assume that all of the resources in the Y candidate slots are available resources upon initialization, at 804. The Y candidate slots may correspond to resources from which the MAC layer may select transmission resources of the UE.

The SW may include one or more time instances where a Tx UE may not be sensing the channel (e.g., partial sensing). For instance, the SW may include occasions where the Tx UE is not transmitting or receiving. The Tx UE may assume that another sidelink UE is transmitting an SCI on resources where the Tx UE is not sensing the channel. Future resources associated with resources where the Tx UE is not sensing the channel may be determined as unavailable resources for the Tx UE. Hence, resource exclusion may be performed, at 806, on the set of available resources $S_A$ based on slots that are not sensed in sensing occasions based on the Y candidate slots for partial sensing.

The set of available resources $S_A$ that the PHY layer reports to the MAC layer after the resource exclusion, at 806, may include a certain amount of remaining resources. At 808, the PHY layer may determine whether the remaining resources in the set of available resources $S_A < X * M_{total}$. $M_{total}$ may correspond to the total number of $L_{subch}$ contiguous subchannels in the Y candidate slots. X may be based on $p_i$=$prio_{Tx}$ and may be indicated via sl-TxPercentageList. Example values for X may include 0.2, 0.35, and 0.5.

If after the resource exclusion, at 806, the amount of resources remaining in the set of available resources $S_A$ is less than $X * M_{total}$, the set of available resources $S_A$ may be reinitialized, at 810, to the resources in the Y candidate slots. That is, the set of available resources may have to be adjusted so that the MAC layer has enough available resources for performing resource selection.

After re-initialization, at 810, resource exclusion may be performed, at 812, on the set of available resources $S_A$ based on received SCIs from other sidelink UEs. In examples where the remaining resources in the set of available resources $S_A$ are determined, at 808, to be greater than or equal to $X * M_{total}$, the resource exclusion may be performed, at 812, without re-initialization, at 810, of the set of available resources $S_A$. The resources that are used by the other sidelink UEs may also be excluded from the set of available resources $S_A$ based on the RSRP threshold.

If the remaining resources in the set of available resources $S_A$ are determined, at 814, to be greater than or equal to $X*M_{total}$, the PHY layer may generate the set of available resources $S_A$ and report, at 818, the set of available resources $S_A$ to the MAC layer. If after the resource exclusion, at 812, the number of resources remaining in the set of available resources $S_A$ is less than $X \cdot M_{total}$, $Th(p_i, p_j)$ may be increased, at 816, by 3 dB for each priority value $Th(p_i, p_j)$ and the available resource determination procedure may be restarted, at 802.

The resource pool may be of a first type that allows for periodic transmissions, where multiple TBs may be transmitted, or the resource pool may be of a second type that does not allow for periodic transmissions. If the resource pool does not allow for periodic transmissions, the Tx UE may not perform PBPS. For example, the parameter sl-multiTBReserve may be disabled. In cases where the resource pool does not allow for periodic transmissions, the Tx UE may not use PBPS for detecting the resource reservations of the other sidelink UEs that may be performing periodic transmissions. Otherwise, the Tx UE may perform both partial sensing techniques (e.g., PBPS and CPS) and may combine sensing results from both techniques to determine the set of available resources $S_A$.

Partial sensing techniques may be used for sidelink Mode 2 Tx resource pools, which may be configured/pre-configured to enable full sensing, partial sensing (e.g., PBPS and CPS), random resource selection, or a combination(s) thereof. PBPS may be used for detecting periodic resource reservations of the other sidelink UEs in the resource pools, which may include periodic resource reservations being enabled based on sl-multiTBReserve. CPS may be used for detecting aperiodic resource reservations of the other sidelink UEs in the resource pools, which may include periodic resource reservations being enabled/disabled. If the resource pools do not allow for periodic transmissions (e.g., sl-multiTBReserve is disabled), the Tx UE may not perform PBPS. Otherwise, the Tx UE may perform both partial sensing techniques (e.g., PBPS and CPS) and may combine sensing results from both techniques to determine the set of available resources $S_A$.

The RSW for full sensing may start at a time of a resource selection trigger and may end at a time of the resource selection trigger plus the PDB of the TB for which the UE is selecting resources. The PDB may be predetermined at the time of the resource selection trigger. If the Tx UE is unable to determine when resource selection may be triggered, the Tx UE may have to perform continuous/full sensing. For example, the PHY layer of the Tx UE may be unable to determine when the MAC layer of the Tx may indicate a transmission. Thus, the PHY layer may have to be prepared to report the set of available resources $S_A$ to the MAC layer as soon as the MAC layer indicates a transmission to the PHY layer.

Partial sensing techniques may allow the PHY layer of the UE to wait for the MAC layer of the UE to indicate the Y candidate slots to be used for transmission. The MAC layer may not determine the Y candidate slots until the MAC layer determines that the Tx UE should perform a transmission. The Tx UE may determine the Y candidate slots for partial sensing based on the PDB associated with the resource selection trigger. Sensing occasions may be based on a time gap between the resource selection trigger and a start of the Y candidate slots.

Figure 9:
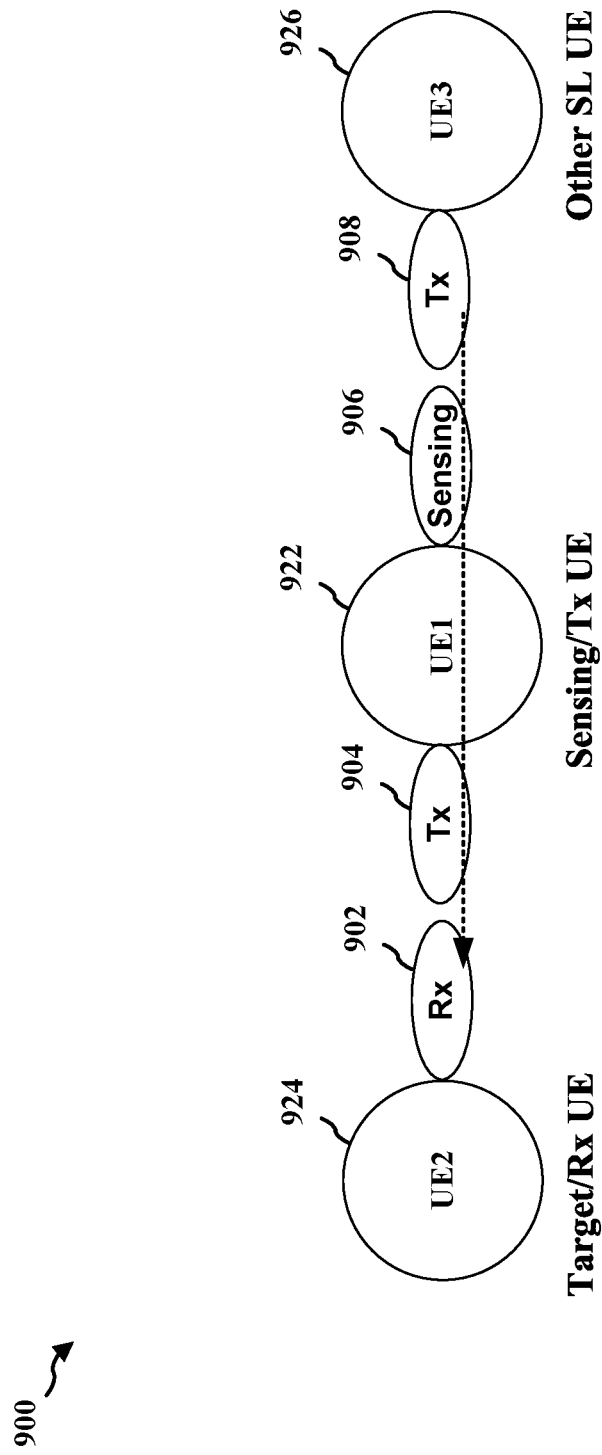
FIG. 9 is a diagram that illustrates an interference sensing technique of a transmit (Tx) UE.

FIG. 9 is a diagram 900 that illustrates an interference sensing technique of a Tx UE. The MAC layer of the sensing/Tx UE (e.g., UE1 922) may indicate to the PHY layer of the sensing/Tx UE (e.g., UE1 922) a sensing beam 906 that the PHY layer may use for sensing the channel. The MAC layer of the UE1 922 may also indicate a transmission configuration indicator (TCI) state and/or a spatial relation to be used by the PHY layer of UE1 922 for performing the full/partial sensing. Such techniques may be performed for FR2 sidelink procedures. The MAC layer may also indicate metrics such as time, bandwidth, priority, etc., to the PHY layer. The PHY layer may determine a sensing beam 906 to use for sensing/receiving SCIs based on the indicated metrics from the MAC layer, as opposed to the PHY layer selecting the sensing beam 906 at random. The MAC layer may trigger the sensing at the PHY layer based on a determination at the MAC layer of a target/Rx UE (e.g., UE2 924) and a first Tx beam 904 associated with the target/Rx UE. The sensing beam 906 and the first Tx beam 904 may or may not be the same beam. The MAC layer may determine which transmit beam(s) may be used to communicate with UE2 924.

In a first example, the sensing beam 906 may be the same beam that UE1 922 uses to transmit to UE2 924. That is, the sensing beam 906 may be the same beam as the first Tx beam 904. In a second example, the sensing beam 906 may not be the same beam that UE1 922 uses to transmit to UE2. That is, the sensing beam 906 may be a different beam from the first Tx beam 904. Thus, the beam that the MAC layer indicates to the PHY layer may or may not be the beam indicated by the MAC layer for transmitting to UE2 924. The MAC layer may indicate to the PHY layer a width of the sensing beam 906 to be used for sensing the channel. However, when transmission begins, UE1 922 may determine to use a narrower beam for communicating with UE2 924.

The sensing beam 906 may have a different width than the first Tx beam 904 used for transmission to UE2 924. For example, the sensing beam 906 may be wider than the first Tx beam 904. For high priority transmissions, such as public safety messages, a wide sensing beam may be used to detect an increased number of nearby interferers, as a wider sensing beam may be configured to sense/receive an increased number of SCIs. Resource elimination and resource selection may be performed in a manner that reduces Tx interference and/or Rx interference. Thus, wider sensing beams may be used more conservatively in some cases.

Sensing and selecting Tx resources may be performed based on wide beams. Transmissions on narrow beams may be performed when the first Tx beam 904 changes frequently and/or continuously from one beam to another beam, which may reduce a sensing frequency. For example, if the sensing is based on a wide beam and UE1 922 switches from a first narrow beam to a second narrow beam that are both within a coverage area or a coverage angle of the wide beam, the resources selected for the first narrow beam may be available on the second narrow beam (e.g., an adjacent narrow beam).

The sensing beam 906 may have a different direction than the first Tx beam 904 used for transmission to UE2 924. The direction of the first Tx beam 904 may have a higher priority in listen-before-talk (LBT) applications than the direction of the first Tx beam 904 in other types of applications, where UE1 922 may attempt to determine interfering transmissions of a second Tx beam 908 from another sidelink UE (e.g., UE3 926) in a direction of an Rx beam 902 of UE2 924. UE1 922 may perform LBT to sense the channel for other transmissions. UE1 922 may utilize a first beam to communicate with UE2 924, but may not detect one or more transmissions of other sidelink UEs, such as the second Tx beam 908 of UE3 926, in the direction of UE2. Hence, UE1 922 may use the sensing beam 906 in an opposite direction of the first Tx beam 904 to scan for transmissions of the other sidelink UEs that may interfere with reception of the first Tx beam 904 by UE2 924.

Sensing beams used for partial sensing may be narrow beams or wide beams based on the number of slots in the Y candidate slots. Narrow beams may be transmitted if the number of Y candidate slots is low. For instance, if there is a decreased number of slots in the Y candidate slots, UE1 922 may sense on narrow beams as opposed to wide beams, which may eliminate a larger portion of available resources. Wide beams may be used for sensing if the number of slots in the Y candidate slots is high. Using wide beams for sensing may increase detection of nearby interfering transmitters, such as UE3 926. However, if the number of slots in the Y candidate slots is low, an advantage of wide beams may be balanced with a possibility of detecting too many interferers and not being able to determine available Tx resources. Wide beams may allow UE1 922 to sense/receive an increased number of SCIs, which may cause an increased number of resources to be eliminated from the set of available resources for performing the transmission from UE1 922 to UE2 924.

Different sensing beams may be indicated by the MAC layer for PBPS and CPS. Wide beams may be used for CPS, as a sensing duration for CPS may be short. For example, wide beams may be transmitted to detect as many nearby interferers as possible during a short sensing duration. In contrast, narrow beams may be used for PBPS, as the sensing duration for PBPS may be longer based on a periodicity.

The MAC layer may select one or more sensing beams (e.g., sensing beam 906) based on a per beam channel busy ratio (CBR) or a channel occupancy ratio (CR), if available. "CBR" refers to a ratio between a time that the channel is sensed as busy (e.g., including signals, noise, etc.) and a total observation time. "CR" refers to a ratio between a time that the UE uses for a transmission of the UE and a total time available for the UE to use for the transmission of the UE. For example, the CR may correspond to a ratio between a number of slots within a time window that the UE uses for the transmission of the UE and the total number of slots within the time window. The MAC layer may select a sensing beam 906 and/or a first Tx beam 904 with a smallest CBR/CR for sensing and/or transmitting. The CBR may be indicative of an amount of traffic being communicated over the channel. If the channel is busy, the CBR may approach a value of 1. If the channel is not busy, the CBR may approach a value of 0. The sensing beam 906 that the MAC layer indicates to the PHY layer may correspond to the beam that includes the smallest CBR/CR.

The MAC layer may indicate multiple beams to the PHY layer for sensing the channel. The PHY layer may use one or more of the indicated beams to perform the sensing. For full sensing, the PHY layer may time multiplex the sensing on multiple beams. The PHY layer may perform sensing on the multiple beams in a round-robin manner. For example, UE1 922 may sense for 10 ms on each beam per turn, or a duration of the sensing may be based on the beam width. The PHY layer may execute multiple sensing procedures on multiple beams for UEs that are configured to use multiple beams simultaneously. That is, if the hardware of UE1 922 has the capability of using multiple beams simultaneously, the PHY layer may use the multiple beams simultaneously to perform the sensing. If the hardware of UE1 922 does not have the capability to use multiple beams simultaneously, the PHY layer may execute a time multiplexing procedure to use different beams over different sensing times to perform the sensing.

The PHY layer may report to the MAC layer multiple sets of available resources $S_A$ corresponding to the multiple beams. The PHY layer may also combine multiple sensing results into one set of available resources $S_A$. The one set of available resources $S_A$ may be reported to the MAC layer from the PHY layer. The set of available resources $S_A$ may be indicative of the sensing beam 906 used for sensing the channel. For instance, the set of available resources $S_A$ may indicate the sensing beam 906 corresponding to each available resource. The MAC layer may determine beams associated with the set of available resources $S_A$ based on the indication.

Figure 10:
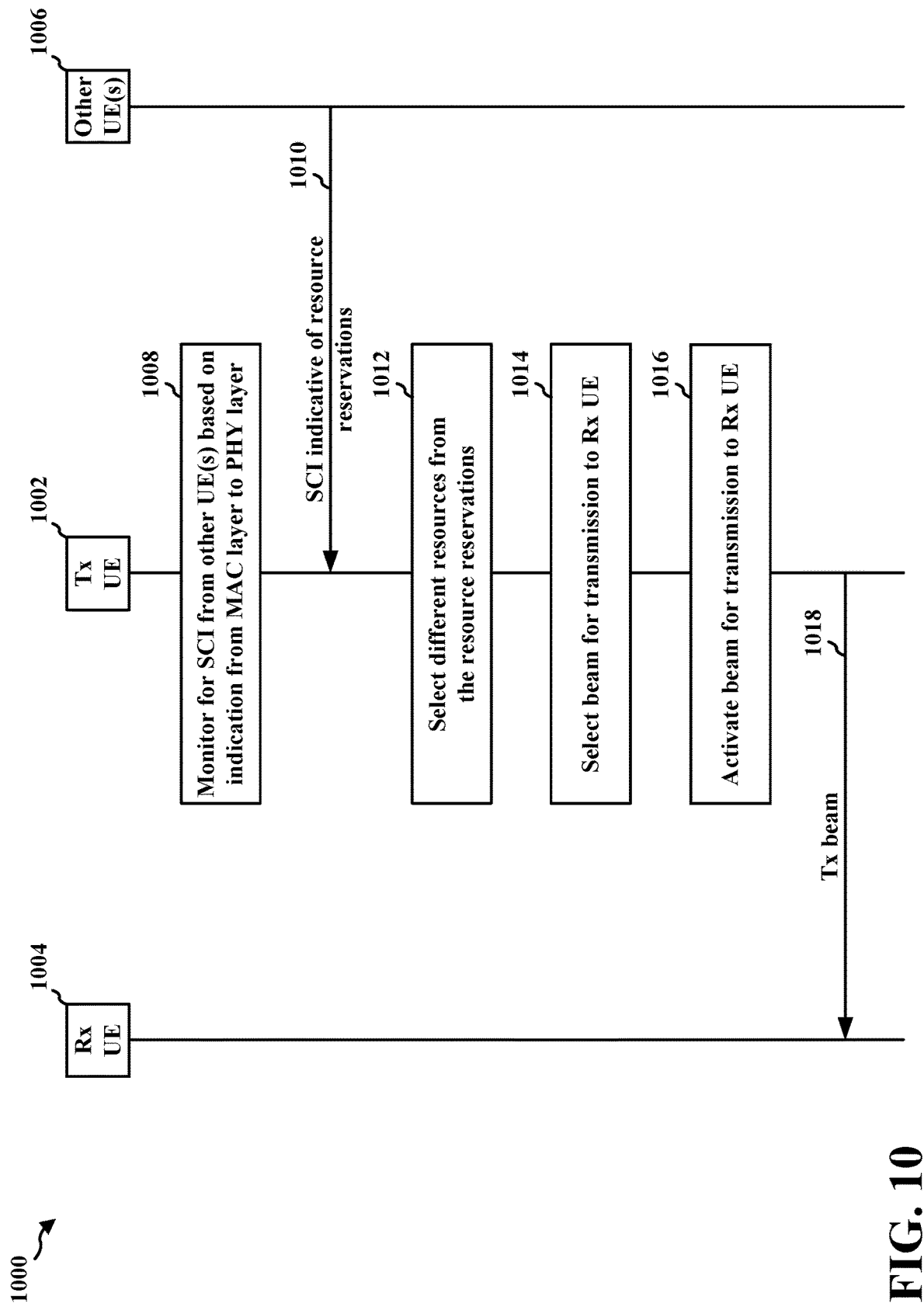
FIG. 10 is a call flow diagram illustrating communications between sidelink UEs.

FIG. 10 is a call flow diagram 1000 illustrating communications between sidelink UEs. The sidelink UEs may include a Tx UE 1002, an Rx UE 1004, and other UE(s) 1006. A MAC layer of the Tx UE 1002 may indicate to the PHY layer of the Tx UE 1002 a sensing beam, a TCI state, and/or a spatial relation (e.g., based on an Rx beam used by the UE) associated with monitoring for SCI transmitted from the other UE(s) 1006. The indication from the MAC layer to the PHY layer may trigger the sensing beam, the TCI state, and/or the spatial relation. Accordingly, at 1008, the Tx UE 1002 may monitor for the SCI from the other UE(s) 1006 based on the indication from the MAC layer to the PHY layer.

At 1010, the Tx UE 1002 may receive SCI indicative of resource reservations from the other UE(s) 1006. The resource reservations may correspond to transmission resources of the other UE(s) 1006. In examples, the transmission resources of the other UE(s) 1006 may interfere with reception of a Tx beam transmitted from the Tx UE 1002 to the Rx UE 1004.

At 1012, the Tx UE 1002 may select different resources from the resource reservations of the other UE(s) 1006 for a transmission from the Tx UE 1002 to the Rx UE 1004. Selection, at 1012, of the different resources may reduce interference from the transmissions of the other UE(s) 1006 to the reception of the beam received at the Rx UE 1004 from the Tx UE 1002. At 1014, the Tx UE 1002 may select the beam for transmission to the Rx UE 1004. Selection, at 1014, of the beam for transmission to the Rx UE 1004 may be configured to reduce interference from the transmissions of the other UE(s) 1006 to the reception of the selected beam received at the Rx UE 1004 from the Tx UE 1002.

At 1016, the Tx UE 1002 may activate the beam for transmission to the Rx UE 1004. The activated beam may be based on the selection, at 1012, of the different resources from the resource reservations of the other UE(s) 1006 and may correspond to the beam selected, at 1014, for the transmission to the Rx UE 1014. At 1018, the Tx UE 1002 may transmit the Tx beam to the Rx UE 1004 on the different resources from the resource reservations of the other UE(s) 1006.

Figure 11:
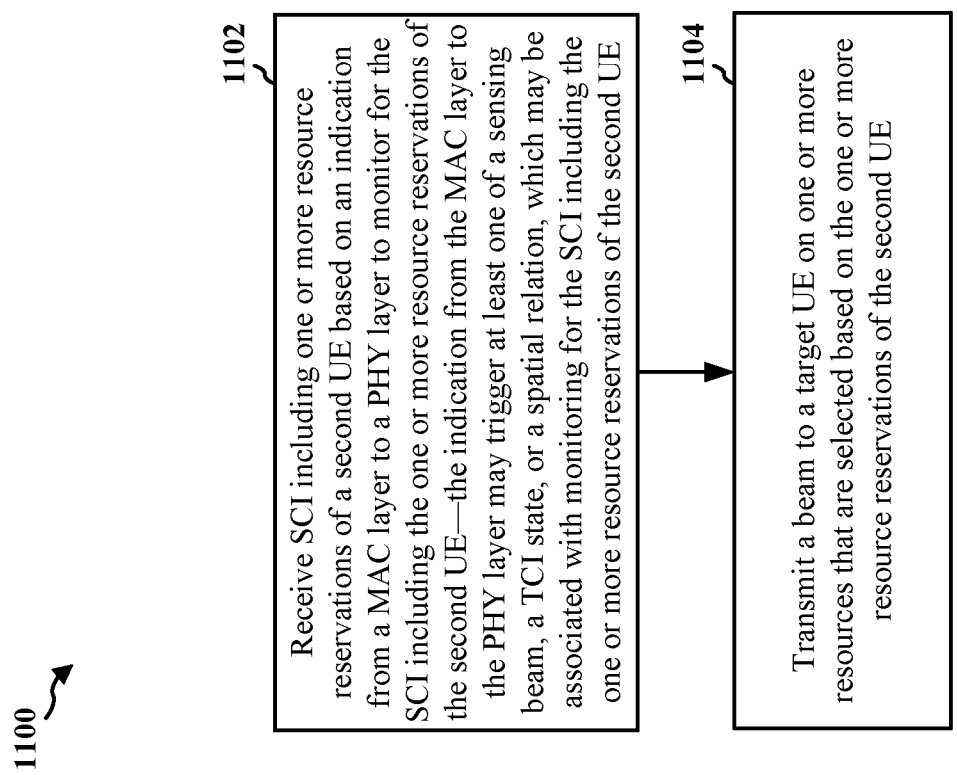
FIG. 11 is a flowchart of a method of wireless communication at a UE.

FIG. 11 is a flowchart 1100 of a method of wireless communication. The method may be performed by a first UE (e.g., the UE 104, 350, 422, 922, 1002, the apparatus 1304, etc.), which may include the memory 360 and which may correspond to the entire UE 104, 350, 422, 922, 1002 or apparatus 1304, or a component of the UE 104, 350, 422, 922, 1002 or the apparatus 1304, such as the TX processor 368, the RX processor 356, the controller/processor 359, the cellular baseband processor 1324, and/or the application processor 1306.

At 1102, the UE may receive SCI including one or more resource reservations of a second UE based on an indication from a MAC layer to a PHY layer to monitor for the SCI including the one or more resource reservations of the second UE—the indication from the MAC layer to the PHY layer may trigger at least one of a sensing beam, a TCI state, or a spatial relation, which may be associated with monitoring for the SCI including the one or more resource reservations of the second UE. For example, referring to FIG. 10, the Tx UE 1002 may receive, at 1010, SCI from the other UE(s) 1006 indicative of resource reservations of the other UE(s) 1006 based on the indication from the MAC layer to the PHY layer to monitor, at 1008, for the SCI from the other UE(s) 1006. The reception, at 1102, may be performed by the sensing beam indication component 198 of the apparatus 1304 in FIG. 13.

At 1104, the UE may transmit a beam to a target UE on one or more resources that are selected based on the one or more resource reservations of the second UE. For example, referring to FIG. 10, the Tx UE 1002 may transmit, at 1018, a Tx beam to the Rx UE 1004 based on the reserved resources indicated in the SCI received, at 1010, from the other UE(s) 1006. The transmission, at 1104, may be performed by the sensing beam indication component 198 of the apparatus 1304 in FIG. 13.

Figure 12:
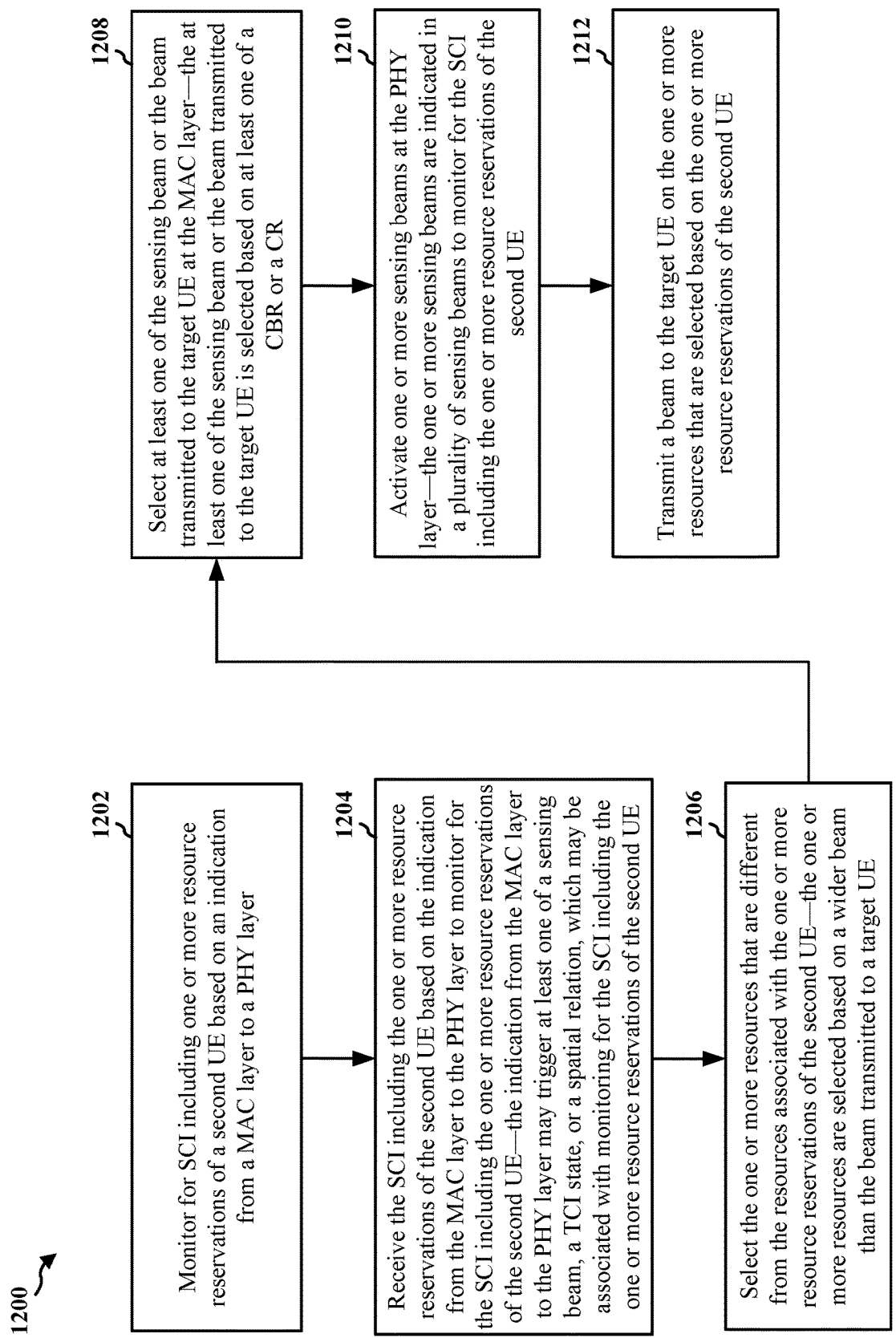
FIG. 12 is a flowchart of a method of wireless communication at a UE.

FIG. 12 is a flowchart 1200 of a method of wireless communication. The method may be performed by a first UE (e.g., the UE 104, 350, 422, 922, 1002, the apparatus 1304, etc.), which may include the memory 360 and which may correspond to the entire UE 104, 350, 422, 922, 1002 or apparatus 1304, or a component of the UE 104, 350, 422, 922, 1002 or the apparatus 1304, such as the TX processor 368, the RX processor 356, the controller/processor 359, the cellular baseband processor 1324, and/or the application processor 1306.

At 1202, the UE may monitor for SCI including one or more resource reservations of a second UE based on an indication from a MAC layer to a PHY layer. For example, referring to FIG. 10, the Tx UE 1002 may monitor, at 1008, for SCI from other UE(s) 1006 based on an indication from the MAC layer to the PHY layer. The monitoring, at 1202, may be performed by the sensing beam indication component 198 of the apparatus 1304 in FIG. 13.

At 1204, the UE may receive the SCI including the one or more resource reservations of the second UE based on the indication from the MAC layer to the PHY layer to monitor for the SCI including the one or more resource reservations of the second UE—the indication from the MAC layer to the PHY layer may trigger at least one of a sensing beam, a TCI state, or a spatial relation, which may be associated with monitoring for the SCI including the one or more resource reservations of the second UE. For example, referring to FIG. 10, the Tx UE 1002 may receive, at 1010, SCI from the other UE(s) 1006 indicative of resource reservations of the other UE(s) 1006 based on the indication from the MAC layer to the PHY layer to monitor, at 1008, for the SCI from the other UE(s) 1006. The reception, at 1204, may be performed by the sensing beam indication component 198 of the apparatus 1304 in FIG. 13.

At 1206, the UE may select the one or more resources that are different from the resources associated with the one or more resource reservations of the second UE—the one or more resources are selected based on a wider beam than the beam transmitted to a target UE. For example, referring to FIG. 10, the Tx UE 1002 may select, at 1012, different resources from the resource reservations of the other UE(s) 1006 indicated in the SCI received, at 1010, from the other UE(s) 1006. The selection, at 1206, may be performed by the sensing beam indication component 198 of the apparatus 1304 in FIG. 13.

At 1208, the UE may select at least one of the sensing beam or the beam transmitted to the target UE at the MAC layer—the at least one of the sensing beam or the beam transmitted to the target UE is selected based on at least one of a CBR or a CR. For example, referring to FIG. 10, the Tx UE 1002 may select, at 1014, a beam for transmission to the Rx UE 1004 based on the reserved resources indicated in the SCI received, at 1010, from the other UE(s) 1006. The selection, at 1208, may be performed by the sensing beam indication component 198 of the apparatus 1304 in FIG. 13.

At 1210, the UE may activate one or more sensing beams at the PHY layer—the one or more sensing beams are indicated in a plurality of sensing beams to monitor for the SCI including the one or more resource reservations of the second UE. For example, referring to FIG. 10, the Tx UE 1002 may activate, at 1016, the beam for transmission to the Rx UE 1004 from a plurality of beams that may be indicated from the MAC layer to the PHY layer to monitor, at 1008, for the SCI from the other UE(s) 1006. The activation, at 1210, may be performed by the sensing beam indication component 198 of the apparatus 1304 in FIG. 13.

At 1212, the UE may transmit a beam to the target UE on the one or more resources that are selected based on the one or more resource reservations of the second UE. For example, referring to FIG. 10, the Tx UE 1002 may transmit, at 1018, a Tx beam to the Rx UE 1004 based on the reserved resources indicated in the SCI received, at 1010, from the other UE(s) 1006. The transmission, at 1212, may be performed by the sensing beam indication component 198 of the apparatus 1304 in FIG. 13.

Figure 13:
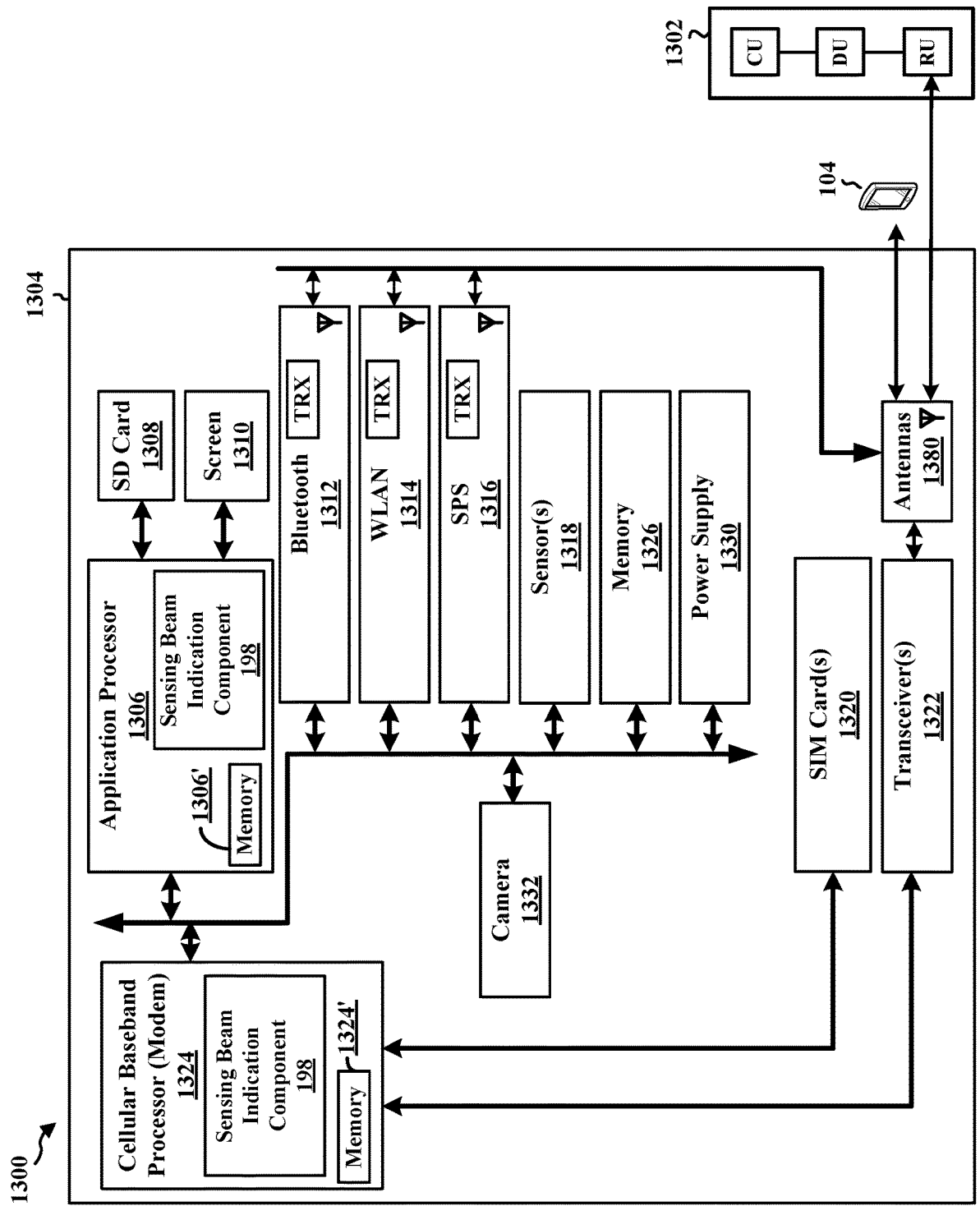
FIG. 13 is a diagram illustrating an example of a hardware implementation for an example network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include a cellular baseband processor 1324 (also referred to as a modem) coupled to one or more transceivers 1322 (e.g., cellular RF transceiver). The cellular baseband processor 1324 may include on-chip memory 1324'. In some aspects, the apparatus 1304 may further include one or more subscriber identity modules (SIM) cards 1320 and an application processor 1306 coupled to a secure digital (SD) card 1308 and a screen 1310. The application processor 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional modules of memory 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor 1324 communicates through the transceiver(s) 1322 via one or more antennas 1380 with the UE 104 and/or with an RU associated with a network entity 1302. The cellular baseband processor 1324 and the application processor 1306 may each include a computer-readable medium/memory 1324', 1306', respectively. The additional modules of memory 1326 may also be considered a computer-readable medium/memory. Each computer-readable medium/memory 1324', 1306', 1326 may be non-transitory. The cellular baseband processor 1324 and the application processor 1306 are each responsible for general processing, including the execution of software stored on the computer-readable medium/memory. The software, when executed by the cellular baseband processor 1324/application processor 1306, causes the cellular baseband processor 1324/application processor 1306 to perform the various functions described supra. The computer-readable medium/memory may also be used for storing data that is manipulated by the cellular baseband processor 1324/application processor 1306 when executing software. The cellular baseband processor 1324/application processor 1306 may be a component of the UE 350 and may include the memory 360 and/or at least one of the TX processor 368, the RX processor 356, and the controller/processor 359. In one configuration, the apparatus 1304 may be a processor chip (modem and/or application) and include just the cellular baseband processor 1324 and/or the application processor 1306, and in another configuration, the apparatus 1304 may be the entire UE (e.g., see 350 of FIG. 3) and include the additional modules of the apparatus 1304.

As discussed supra, the sensing beam indication component 198 is configured to SCI including one or more resource reservations of a second UE based on an indication from a MAC layer to a PHY layer to monitor for the SCI including the one or more resource reservations of the second UE, the indication from the MAC layer to the PHY layer triggering at least one of a sensing beam, a TCI state, or a spatial relation, where the at least one of the sensing beam, the TCI state, or the spatial relation is associated with monitoring for the SCI including the one or more resource reservations of the second UE; and transmit a beam to a target UE on one or more resources that are selected based on the one or more resource reservations of the second UE. The sensing beam indication component 198 may be within the cellular baseband processor 1324, the application processor 1306, or both the cellular baseband processor 1324 and the application processor 1306. The sensing beam indication component 198 may be one or more hardware components specifically configured to carry out the stated processes/algorithm, implemented by one or more processors configured to perform the stated processes/algorithm, stored within a computer-readable medium for implementation by one or more processors, or some combination thereof.

As shown, the apparatus 1304 may include a variety of components configured for various functions. In one configuration, the apparatus 1304, and in particular the cellular baseband processor 1324 and/or the application processor 1306, includes means for receiving SCI including one or more resource reservations of a second UE based on an indication from a MAC layer to a PHY layer to monitor for the SCI including the one or more resource reservations of the second UE, the indication from the MAC layer to the PHY layer triggering at least one of a sensing beam, a TCI state, or a spatial relation, where the at least one of the sensing beam, the TCI state, or the spatial relation is associated with monitoring for the SCI including the one or more resource reservations of the second UE; and means for transmitting a beam to a target UE on one or more resources that are selected based on the one or more resource reservations of the second UE. The apparatus 1304 further includes means for monitoring for the SCI including the one or more resource reservations of the second UE based on the indication from the MAC layer to the PHY layer. The apparatus 1304 further includes means for selecting the one or more resources that are different from the resources associated with the one or more resource reservations of the second UE, where the one or more resources are selected based on a wider beam than the beam transmitted to the target UE. The apparatus 1304 further includes means for selecting at least one of the sensing beam or the beam transmitted to the target UE at the MAC layer, where the at least one of the sensing beam or the beam transmitted to the target UE is selected based on at least one of a CBR or a CR. The apparatus 1304 further includes means for activating one or more sensing beams at the PHY layer, where the one or more sensing beams are indicated in the plurality of sensing beams to monitor for the SCI including the one or more resource reservations of the second UE.

The means may be the sensing beam indication component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving SCI including one or more resource reservations of a second UE based on an indication from a MAC layer to a PHY layer to monitor for the SCI including the one or more resource reservations of the second UE, the indication from the MAC layer to the PHY layer triggering at least one of a sensing beam, a TCI state, or a spatial relation, where the at least one of the sensing beam, the TCI state, or the spatial relation is associated with monitoring for the SCI including the one or more resource reservations of the second UE; and transmitting a beam to a target UE on one or more resources that are selected based on the one or more resource reservations of the second UE.

Aspect 2 may be combined with aspect 1 and further includes monitoring for the SCI including the one or more resource reservations of the second UE based on the indication from the MAC layer to the PHY layer.

Aspect 3 may be combined with any of aspects 1-2 and includes that the indication from the MAC layer to the PHY layer triggering the sensing beam is based on at least one of the target UE or the beam transmitted to the target UE.

Aspect 4 may be combined with any of aspects 1-3 and includes that the sensing beam is a same beam as the beam transmitted to the target UE.

Aspect 5 may be combined with any of aspects 1-3 and includes that the sensing beam is a different beam from the beam transmitted to the target UE.

Aspect 6 may be combined with any of aspects 1-3 or 5 and includes that the sensing beam includes a different beam width than the beam transmitted to the target UE.

Aspect 7 may be combined with any of aspects 1-3 or 5-6 and further includes selecting the one or more resources that are different from the resources associated with the one or more resource reservations of the second UE, where the one or more resources are selected based on a wider beam than the beam transmitted to the target UE.

Aspect 8 may be combined with any of aspects 1-3 or 5-7 and includes that the sensing beam corresponds to a different beam direction than a beam direction for the beam transmitted to the target UE.

Aspect 9 may be combined with any of aspects 1-8 and includes that a width of the sensing beam is based on a number of sensing slots, such that the width of the sensing beam is increased based on an increased number of the number of sensing slots.

Aspect 10 may be combined with any of aspects 1-9 and includes that a width of the sensing beam is based on whether the sensing beam is associated with PBPS or CPS, the width of the sensing beam being wider if the sensing beam is associated with the CPS than if the sensing beam is associated with the PBPS.

Aspect 11 may be combined with any of aspects 1-10 and includes that a width of the sensing beam is based on a priority of a transmission to the target UE, the width of the sensing beam being increased if the priority of the transmission to the target UE is decreased.

Aspect 12 may be combined with any of aspects 1-11 and further includes selecting at least one of the sensing beam or the beam transmitted to the target UE at the MAC layer, where the at least one of the sensing beam or the beam transmitted to the target UE is selected based on at least one of a CBR or a CR.

Aspect 13 may be combined with any of aspects 1-12 and includes that the at least one of the sensing beam or the beam transmitted to the target UE is included in a plurality of beams, a selection of the at least one of the sensing beam or the beam transmitted to the target UE corresponding to at least one of a smallest CBR or a smallest CR associated with the plurality of beams.

Aspect 14 may be combined with any of aspects 1-13 and includes that the indication from the MAC layer to the PHY layer is indicative of a plurality of sensing beams associated with the monitoring for the SCI including the one or more resource reservations of the second UE, the sensing beam being included in the plurality of sensing beams.

Aspect 15 may be combined with any of aspects 1-14 and further includes activating one or more sensing beams at the PHY layer, where the one or more sensing beams are indicated in the plurality of sensing beams to monitor for the SCI including the one or more resource reservations of the second UE.

Aspect 16 may be combined with any of aspects 1-15 and includes that the one or more sensing beams are activated based on a time sequence.

Aspect 17 may be combined with any of aspects 1-16 and includes that the indication from the MAC layer to the PHY layer indicative of the plurality of sensing beams is based on a separate indication from the PHY layer to the MAC layer of at least one set of available resources associated with the plurality of sensing beams.

Aspect 18 is an apparatus for wireless communication for implementing a method as in any of aspects 1-17.

Aspect 19 is an apparatus for wireless communication including means for implementing a method as in any of aspects 1-17.

Aspect 20 may be combined with any of aspects 18-19 and further includes at least one of a transceiver or an antenna coupled to at least one processor of the apparatus.

Aspect 21 is a non-transitory computer-readable medium storing computer executable code, the code when executed by at least one processor causes the at least one processor to implement a method as in any of aspects 1-17.

What is claimed is:

1. An apparatus for wireless communication at a user equipment (UE), comprising:
memory; and
at least one processor coupled to the memory and, based at least in part on information stored in the memory, the at least one processor is configured to:
receive sidelink control information (SCI) including one or more resource reservations of a second UE based on an indication from a medium access control (MAC) layer to a physical (PHY) layer to monitor for the SCI including the one or more resource reservations of the second UE, the indication from the MAC layer to the PHY layer triggering at least one of a sensing beam, a transmission configuration indicator (TCI) state, or a spatial relation, wherein the at least one of the sensing beam, the TCI state, or the spatial relation is associated with monitoring for the SCI including the one or more resource reservations of the second UE,
wherein a width of the sensing beam is based on whether the sensing beam is associated with periodic-based partial sensing (PBPS) or contiguous partial sensing (CPS), the width of the sensing beam being wider if the sensing beam is associated with the CPS than if the sensing beam is associated with the PBPS or wherein the width of the sensing beam is based on a priority of a transmission to a target UE, the width of the sensing beam being increased if the priority of the transmission to the target UE is decreased; and
transmit a beam to the target UE on one or more resources that are selected based on the one or more resource reservations of the second UE.

2. The apparatus of claim 1, wherein the at least one processor is further configured to monitor for the SCI including the one or more resource reservations of the second UE based on the indication from the MAC layer to the PHY layer.

3. The apparatus of claim 1, wherein the indication from the MAC layer to the PHY layer triggering the sensing beam is based on at least one of the target UE or the beam transmitted to the target UE.

4. The apparatus of claim 1, wherein the sensing beam is a same beam as the beam transmitted to the target UE.

5. The apparatus of claim 1, wherein the sensing beam is a different beam from the beam transmitted to the target UE.

6. The apparatus of claim 5, wherein the sensing beam includes a different beam width than the beam transmitted to the target UE.

7. The apparatus of claim 5, wherein the at least one processor is further configured to select the one or more resources that are different from the resources associated with the one or more resource reservations of the second UE, wherein the one or more resources are selected based on a wider beam than the beam transmitted to the target UE.

8. The apparatus of claim 5, wherein the sensing beam corresponds to a different beam direction than a beam direction for the beam transmitted to the target UE.

9. The apparatus of claim 1, wherein a width of the sensing beam is based on a number of sensing slots, such that the width of the sensing beam is increased based on an increased number of the number of sensing slots.

10. The apparatus of claim 1, wherein the width of the sensing beam is based on whether the sensing beam is associated with the PBPS or the CPS, the width of the sensing beam being wider if the sensing beam is associated with the CPS than if the sensing beam is associated with the PBPS.

11. The apparatus of claim 1, wherein the width of the sensing beam is based on the priority of a transmission to the target UE, the width of the sensing beam being increased if the priority of the transmission to the target UE is decreased.

12. The apparatus of claim 1, wherein the at least one processor is further configured to select at least one of the sensing beam or the beam transmitted to the target UE at the MAC layer based on at least one of a channel busy ratio (CBR) or a channel occupancy ratio (CR).

13. The apparatus of claim 12, wherein the at least one of the sensing beam or the beam transmitted to the target UE is included in a plurality of beams, a selection of the at least one of the sensing beam or the beam transmitted to the target UE corresponding to at least one of a smallest CBR or a smallest CR associated with the plurality of beams.

14. The apparatus of claim 1, wherein the indication from the MAC layer to the PHY layer is indicative of a plurality of sensing beams associated with the monitoring for the SCI including the one or more resource reservations of the second UE, the sensing beam being included in the plurality of sensing beams.

15. The apparatus of claim 14, wherein the at least one processor is further configured to activate one or more sensing beams at the PHY layer, wherein the one or more sensing beams are indicated in the plurality of sensing beams to monitor for the SCI including the one or more resource reservations of the second UE.

16. The apparatus of claim 15, wherein to activate the one or more sensing beams, the at least one processor is configured to activate the one or more sensing beams based on a time sequence.

17. The apparatus of claim 14, wherein the indication from the MAC layer to the PHY layer indicative of the plurality of sensing beams is based on a separate indication from the PHY layer to the MAC layer of at least one set of available resources associated with the plurality of sensing beams.

18. The apparatus of claim 1, further comprising at least one of a transceiver or an antenna coupled to the at least one processor.

19. A method of wireless communication at a first user equipment (UE), comprising:
receiving sidelink control information (SCI) including one or more resource reservations of a second UE based on an indication from a medium access control (MAC) layer to a physical (PHY) layer to monitor for the SCI including the one or more resource reservations of the second UE, the indication from the MAC layer to the PHY layer triggering at least one of a sensing beam, a transmission configuration indicator (TCI) state, or a spatial relation, wherein the at least one of the sensing beam, the TCI state, or the spatial relation is associated with the SCI including the one or more resource reservations of the second UE being monitored,
wherein a width of the sensing beam is based on whether the sensing beam is associated with periodic-based partial sensing (PBPS) or contiguous partial sensing (CPS), the width of the sensing beam being wider if the sensing beam is associated with the CPS than if the sensing beam is associated with the PBPS or wherein the width of the sensing beam is based on a priority of a transmission to a target UE, the width of the sensing beam being increased if the priority of the transmission to the target UE is decreased; and transmitting a beam to the target UE on one or more resources that are selected based on the one or more resource reservations of the second UE.

20. The method of claim 19, further comprising monitoring for the SCI including the one or more resource reservations of the second UE based on the indication from the MAC layer to the PHY layer.

21. The method of claim 19, wherein the indication from the MAC layer to the PHY layer triggering the sensing beam is based on at least one of the target UE or the beam transmitted to the target UE.

22. The method of claim 19, wherein the sensing beam is a same beam as the beam transmitted to the target UE.

23. The method of claim 19, wherein the sensing beam is a different beam from the beam transmitted to the target UE.

24. The method of claim 19, wherein a width of the sensing beam is based on a number of sensing slots, such that the width of the sensing beam is increased based on an increased number of the number of sensing slots.

25. The method of claim 19, wherein the width of the sensing beam is based on whether the sensing beam is associated with the PBPS or the CPS, the width of the sensing beam being wider if the sensing beam is associated with the CPS than if the sensing beam is associated with the PBPS.

26. The method of claim 19, wherein the width of the sensing beam is based on the priority of a transmission to the target UE, the width of the sensing beam being increased if the priority of the transmission to the target UE is decreased.

27. The method of claim 19, further comprising selecting at least one of the sensing beam or the beam transmitted to the target UE at the MAC layer, wherein the at least one of the sensing beam or the beam transmitted to the target UE is selected based on at least one of a channel busy ratio (CBR) or a channel occupancy ratio (CR).

28. The method of claim 19, wherein the indication from the MAC layer to the PHY layer is indicative of a plurality of sensing beams associated with the monitoring for the SCI including the one or more resource reservations of the second UE, the sensing beam being included in the plurality of sensing beams.

29. An apparatus for wireless communication at a first user equipment (UE), comprising:
means for receiving sidelink control information (SCI) including one or more resource reservations of a second UE based on an indication from a medium access control (MAC) layer to a physical (PHY) layer to monitor for the SCI including the one or more resource reservations of the second UE, the indication from the MAC layer to the PHY layer triggering at least one of a sensing beam, a transmission configuration indicator (TCI) state, or a spatial relation, wherein the at least one of the sensing beam, the TCI state, or the spatial relation is associated with monitoring for the SCI including the one or more resource reservations of the second UE,
wherein a width of the sensing beam is based on whether the sensing beam is associated with periodic-based partial sensing (PBPS) or contiguous partial sensing (CPS), the width of the sensing beam being wider if the sensing beam is associated with the CPS than if the sensing beam is associated with the PBPS or wherein the width of the sensing beam is based on a priority of a transmission to a target UE, the width of the sensing beam being increased if the priority of the transmission to the target UE is decreased; and
means for transmitting a beam to a target UE on one or more resources that are selected based on the one or more resource reservations of the second UE.

30. A non-transitory computer-readable medium storing computer executable code, the code when executed by at least one processor at a first user equipment (UE) causes the at least one processor to:
receive sidelink control information (SCI) including one or more resource reservations of a second UE based on an indication from a medium access control (MAC) layer to a physical (PHY) layer to monitor for the SCI including the one or more resource reservations of the second UE, the indication from the MAC layer to the PHY layer triggering at least one of a sensing beam, a transmission configuration indicator (TCI) state, or a spatial relation, wherein the at least one of the sensing beam, the TCI state, or the spatial relation is associated with monitoring for the SCI including the one or more resource reservations of the second UE,
wherein a width of the sensing beam is based on whether the sensing beam is associated with periodic-based partial sensing (PBPS) or contiguous partial sensing (CPS), the width of the sensing beam being wider if the sensing beam is associated with the CPS than if the sensing beam is associated with the PBPS or wherein the width of the sensing beam is based on a priority of a transmission to a target UE, the width of the sensing beam being increased if the priority of the transmission to the target UE is decreased; and
transmit a beam to a target UE on one or more resources that are selected based on the one or more resource reservations of the second UE.

* * * * *